(12) United States Patent
Moore

(10) Patent No.: US 10,121,398 B2
(45) Date of Patent: Nov. 6, 2018

(54) FLAG STOPPER

(71) Applicant: Cynthia Marie Moore, Houma, LA (US)

(72) Inventor: Cynthia Marie Moore, Houma, LA (US)

( * ) Notice: Subject to any disclaimer, the term of this patent is extended or adjusted under 35 U.S.C. 154(b) by 0 days.

(21) Appl. No.: 15/622,070

(22) Filed: Jun. 13, 2017

(65) Prior Publication Data
US 2018/0053454 A1 Feb. 22, 2018

Related U.S. Application Data

(60) Provisional application No. 62/494,784, filed on Aug. 22, 2016.

(51) Int. Cl.
*G09F 17/00* (2006.01)
*F16M 13/02* (2006.01)

(52) U.S. Cl.
CPC .............. *G09F 17/00* (2013.01); *F16M 13/02* (2013.01)

(58) Field of Classification Search
CPC ................. G09F 17/00; G09F 17/0091; G09F 2017/005; G09F 2017/0058; F16M 13/02
See application file for complete search history.

(56) References Cited

U.S. PATENT DOCUMENTS

| | | | | |
|---|---|---|---|---|
| 5,806,819 A * | 9/1998 | Martone | .................... | F16B 2/10 24/16 PB |
| 7,261,263 B2 * | 8/2007 | Baker et al. | .............. | A47F 5/04 24/24 |
| 7,421,972 B1 * | 9/2008 | Long | ........................ | G09F 17/00 116/173 |
| 8,096,927 B2 * | 1/2012 | Hamilton | ........... | A63B 21/0728 24/502 |
| 8,616,145 B1 * | 12/2013 | Ferran | ..................... | G09F 17/00 116/173 |
| 8,621,771 B2 * | 1/2014 | Amalaha | ................. | F04D 17/04 116/173 |
| 9,792,842 B2 * | 10/2017 | Carson | .................... | G09F 17/00 |
| 2005/0028722 A1 * | 2/2005 | Arntz | ...................... | G09F 17/00 116/173 |
| 2005/0098083 A1 * | 5/2005 | Petrenko | ................. | G09F 17/00 116/173 |

FOREIGN PATENT DOCUMENTS

JP 2002358037 A * 12/2002 ............. G09F 17/00

* cited by examiner

*Primary Examiner* — R. A. Smith
(74) *Attorney, Agent, or Firm* — Norton IP Law Firm; Taylor M. Norton

(57) ABSTRACT

The present disclosure provides for a flag stopper that is used in conjunction with a flagpole from which a flag, banner, or other fabric cloth hangs. The flag stopper may be fabricated from a sheet of flexible material that can be removably connected to a flagpole. The flag stopper preferably comprises a planar body having a pair of coplanar legs preferably configured to flex in opposing directions to facilitate its removable connection and firm engagement with a flagpole. When connected to a flagpole, the preferred flag stopper radially extends outwardly from the flagpole, and a flag that is mounted on the flagpole will be forced to remain in such position, thereby preventing the flag from flying off the flagpole.

20 Claims, 18 Drawing Sheets

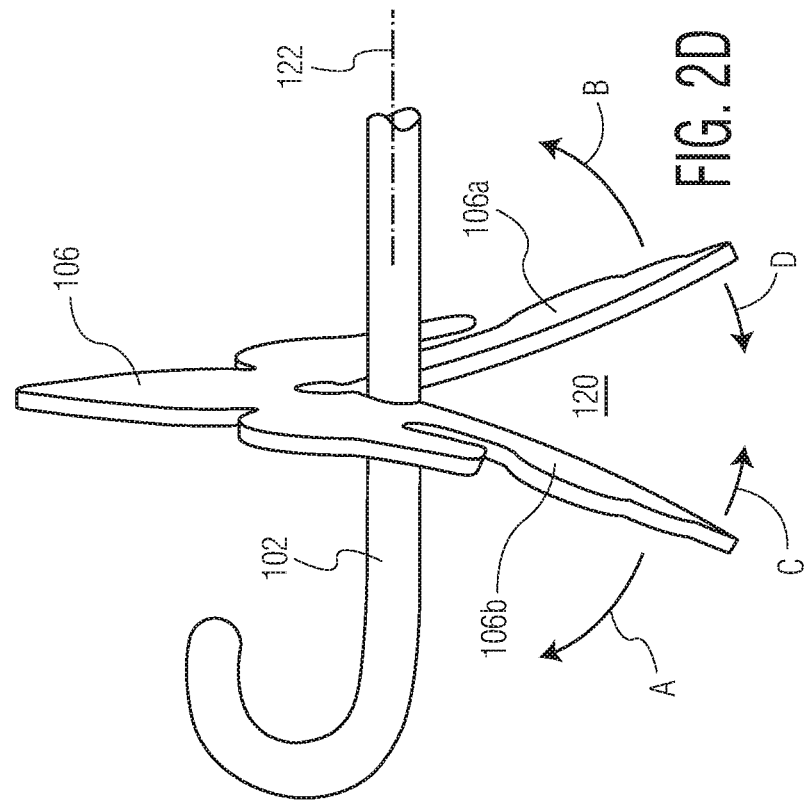
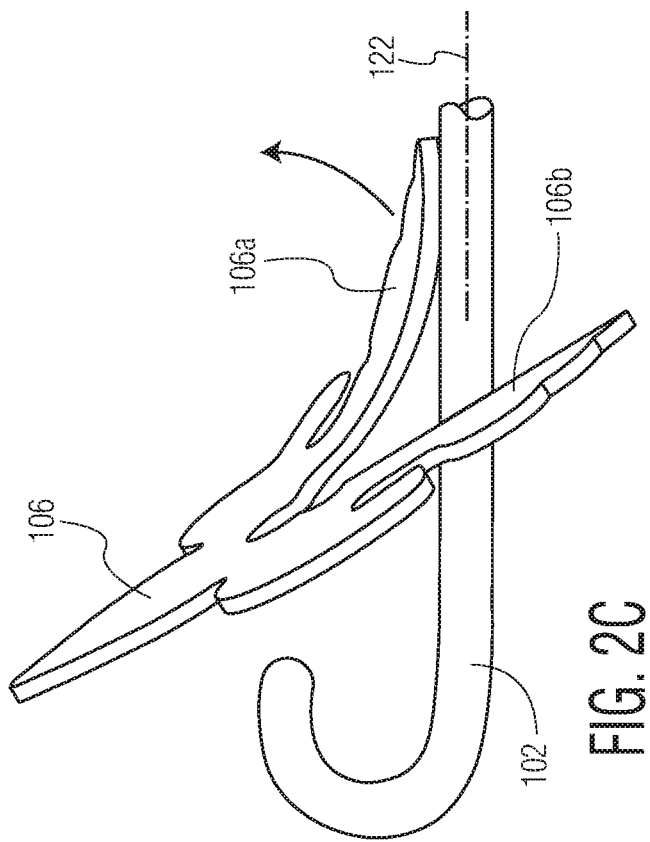

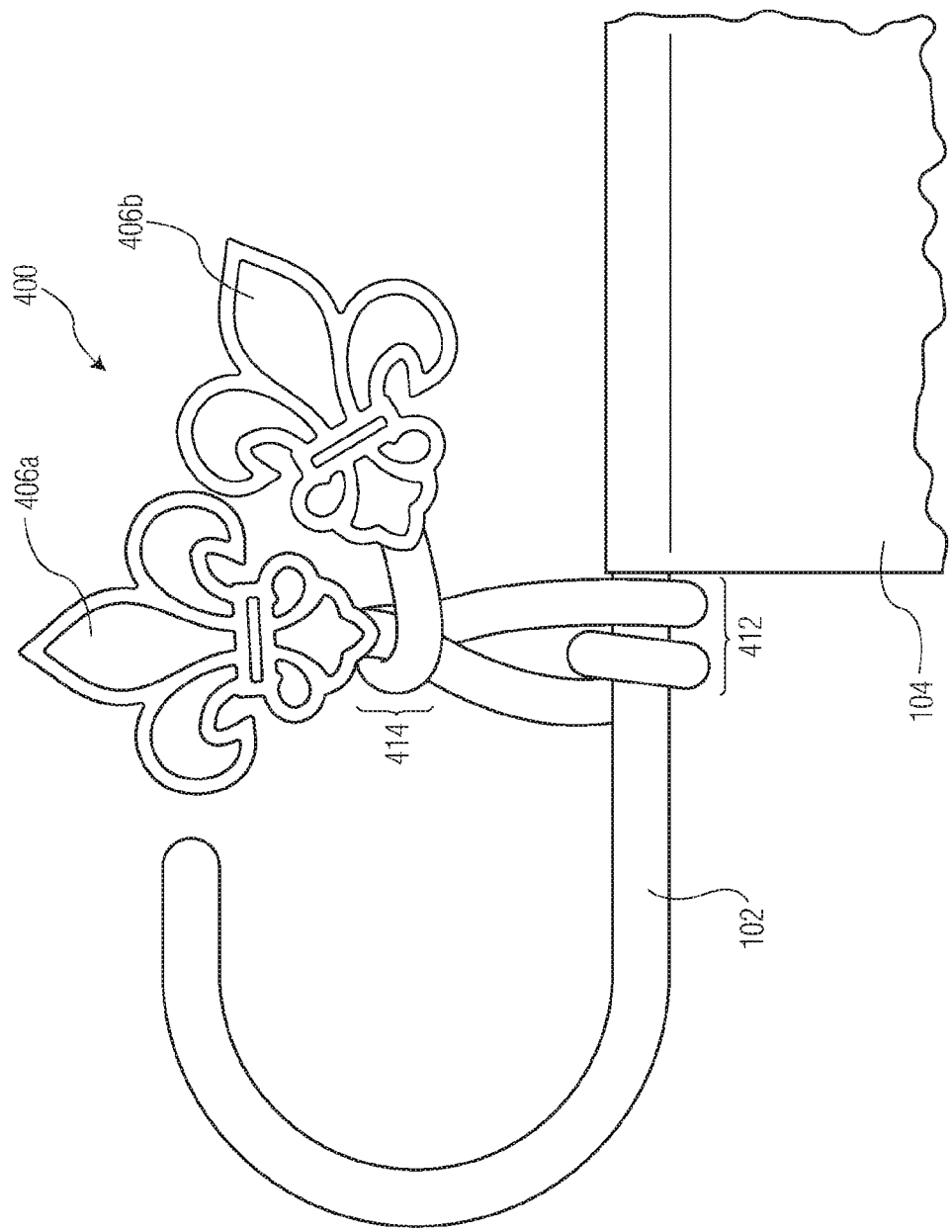

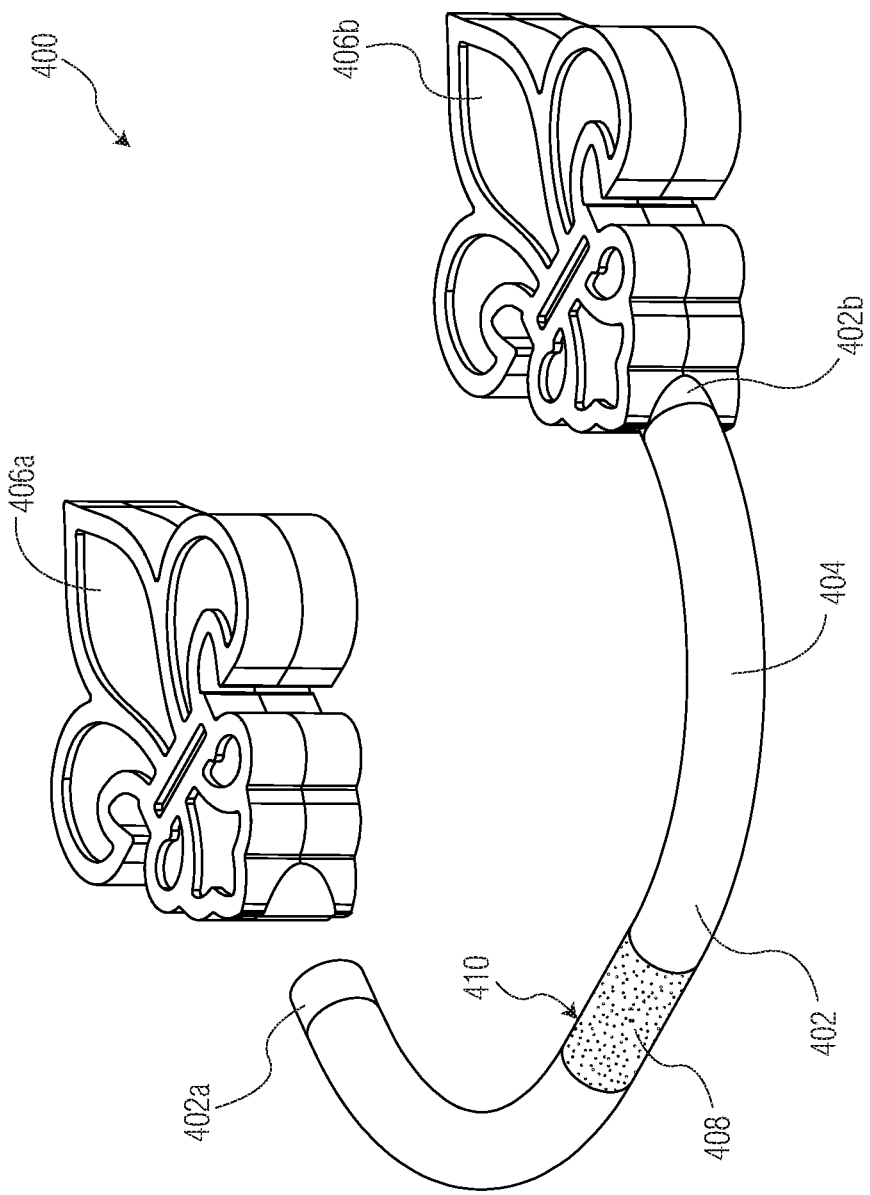

FLAG STOPPER

CROSS REFERENCE TO RELATED APPLICATIONS

This application claims the benefit of U.S. Provisional Application No. 62/494,784, filed on Aug. 22, 2016, which is incorporated here by reference in its entirety.

BACKGROUND OF THE INVENTION

Field of the Invention

The present invention generally relates to flag holder devices and more particularly relates to retention devices of universal size for mounting on flagpoles of various sizes for preventing a flag from sliding off of flagpoles due to forces exerted by steady winds and/or gusts.

Description of the Related Art

People around the world enjoy hanging and flying a variety of flags from flagpoles of numerous different sizes, including flagpoles mounted upon various structures or freestanding in their yards and gardens. Windy conditions often cause flags to detach and fly away from flagpoles, which can pose a hazard or risk to people, and the lost of such flags can also be costly. A variety of different types of flag holders, flag attachments, and sign supports are frequently employed in efforts to retain flags upon the flagpoles.

Many such retention devices are typically heavy, of complex construction, or are not easily securable to flagpoles, as described in U.S. Pat. No. 975,114 issued in 1910 to Blank; U.S. Pat. No. 1,680,703 issued in 1928 to Sullivan; U.S. Pat. No. 4,700,655 issued in 1987 to Kirby. While these conventional units may be suitable for the particular purpose employed, they would not be as suitable for the purposes of the present invention as disclosed hereafter. None of such patents disclose the unique structures and advantages of the present disclosure.

A need exists for flag stopper retention devices that will help maintain the position of flags on flagpoles, where the flag stoppers are comparatively of simple construction and arrangement, and where the flag stoppers are strong, durable, and efficient in its use.

A need exists for a flag stopper capable of universal application to flagpoles of varying orientation and of varying thicknesses.

Accordingly, there is a need for a compact portable lightweight and strong flag stopper apparatus for securely retaining a flag against axial movement relative to the supporting flagpole by winds or gusts, that may be easily positioned and/or repositioned at the option and intention of the user without complex assembly and setup.

As disclosed in this application, the inventor has discovered novel and unique devices and methods for retaining flags on flagpoles, which exhibit superlative properties without being dependent on heavy, immobile, components.

The devices and methods disclosed herein avoid many of the drawbacks of existing methods and devices which rely on expensive complexities or complex tools for application of the devices to the flagpole.

Embodiments of the present invention provide for flag stopper devices and methods as described and defined in the description below and in the annexed claims which provide for improved mobility, setup, and retention characteristics in order to efficiently retain the flags upon various sizes of flagpoles of interest in a multitude of environments. Each patent application identified above is incorporated here by reference in its entirety.

SUMMARY OF THE INVENTION

It is one prospect of the present invention to provide a novel flag stopper of simple but effective construction which can be applied to varying sizes of poles and efficiently connected to securely retain flags, banners, and similar signs of different sizes and shapes on various types of poles of a user, and in particular, a flagpole.

It is also an aim of the present invention to provide an improved flag stopper without complicated screws and rods, that is preferably of economical and unitary construction, overcoming the complexities and limitations of conventional flag stoppers. Further objects of the invention are to provide a flag retention device which is comparatively simple in its construction and arrangement, strong, durable, efficient in its use, readily set up in operative position with respect to a flagpole, and comparatively inexpensive to manufacture.

Another object of the present invention is to provide a flag stopper which allows quick adjustment of the positioning of the flag retention device upon the flagpole by allowing easy adjustment of the flag stopper by a user.

Yet another object of the present invention is to provide a flag stopper retention device wherein the flag stopper is a sign element containing a message and/or other visually appealing design elements thereon, and wherein the flag stopper is easily attached and detached from the flagpole shaft at the option of the user.

Additional objects, advantages and novel features of this invention shall be set forth in the description that follows, and in part will become apparent to those skilled in the art upon examination of the following specification and claims of my invention. The objects and advantages of the invention may be realized and attained by means of the instrumentalities, combinations, and devices particularly pointed out in the appended claims.

The following presents a simplified summary of the present disclosure in a simplified form as a prelude to the more detailed description that is presented herein.

Therefore, to achieve the foregoing and other objects and in accordance with the purposes and embodiments of the present invention, as embodied and described herein, there is provided a flag stopper comprising a preferably elongated planar body, where the planar body has pair of elongated legs in coplanar alignment with each other.

At times, the location where the legs are connected may be referred to as a proximal portion and the opposing ends as a distal portion. The pair of elongated legs define a narrow elongated slot or slit that is connected to, or in direct communication with, a plurality of large round tiered apertures of decreasing size. The tiered apertures are preferably sized and communicatively configured to firmly receive and secure or grab a portion of an outer cylindrical surface of a large diameter flagpole and alternatively a small diameter flagpole, respectively. In other words, in one embodiment, a large diameter flagpole will securely fit within the larger aperture, while a smaller diameter flagpole will move pass the larger aperture and securely fit within a smaller aperture.

The elongated legs are preferably configured to flex longitudinally away from each other by twisting said legs in opposing directions to provide passage of a flagpole therebetween and then retract back into position so as to contract around the cylindrical surface of the flagpole, so that the flag stopper extends radially outwardly from said flagpole (along a plane transverse thereto) to retain a flag while the flag stopper is detachably coupled to and retained by the flagpole.

In a preferred embodiment, the elongated planar body of the flag stopper is a single piece of unitary construction in the shape of a fleur-de-lis.

In another preferred embodiment, the elongated planar body is of unitary construction in the shape of a fleur-de-lis forming three pedals, such that the centered pedal is configured to receive the grasp of a user.

Each elongated leg preferably has a flat and straight inner surface configured to guide the flagpole toward the tiered apertures when the legs of the flag stopper are pressed against the flagpole. In accordance with embodiments illustrated in the Figures and described in detail below, only one of the elongated legs flexes longitudinally to provide for the passage of the flagpole between the legs and into one of the tiered apertures.

In one embodiment, the elongated planar body is of unitary construction in the shape of a fleur-de-lis forming three pedals, and each elongated leg has a flat inner surface portion opposing a laterally extending outer surface portion of tiered orientation. Such outer surface portions is configured to receive the grasp of a user and be flexed longitudinally apart by the user, thereby allowing one of the tiered apertures to receive the flagpole and contract around the flagpole upon the release of the legs by the user.

In one embodiment, each elongated leg of the flag stopper is characterized as having a length sufficient to extend along the opposing surface of each respective side of a flag firmly disposed and secured therebetween, the elongated legs thereby providing resistance against axial and lateral movement of the flag to prevent intertwining of the flag around the flagpole. In one embodiment, the elongated legs are characterized as having a length either equal to or greater than the length of the flag.

In a preferred embodiment, the body of the flag stopper is a single piece of a homogenous material, allowing for economical fabrication and efficient use of the flag stopper.

In a preferred embodiment, the planar body has a coplanar pair of elongated legs having a sufficient height, width, and modulus of elasticity for the legs to flex longitudinally away from each other by a user twisting the coplanar pair of legs in opposing directions. Such twisting of the legs provides a passageway for a flagpole between the legs and into one of the tiered apertures. In such preferred embodiment, the legs retract back into their practically original coplanar position such that one of the tiered apertures contracts around the cylindrical surface of the flagpole, when the user releases the force of the user's grasp being exerted on the pair of elongated legs.

In another preferred embodiment, a flag stopper is provided for use with a cylindrical flagpole that is configured to retain a flag, where the flag stopper has a round planar body forming two opposing planar surfaces. Such body has an outer portion relative to an inner portion. In such embodiment, the body defines a plurality of evenly spaced concentrically (inwardly) extending projections, where each projection extends inwardly from a proximal base portion of the outer portion of the planar body, to a distal end of the projection disposed at the inner portion of the flag stopper. The distal or innermost end preferably defines an outwardly and radially extending concave tip, such that the outwardly concave tips of the plurality of projections is configured in a circular manner to firmly engage a portion of the circumference of the cylindrical flagpole when it is received between the projections.

In one embodiment, the plurality of evenly spaced concentrically extending projections comprises a first set of at least two or more evenly spaced projections preferably of equal length to one another in the first set, and a second set of at least two or more evenly spaced projections preferably of equal length to one another in the second set, wherein the projections of the first set are characterized as having a length greater than the length of the projections of the second set.

In one preferred embodiment, the projections of the first set are characterized as having a length greater than the length of the projections of the second set, such that the first set is configured to firmly and removably receive and secure a portion of an outer cylindrical surface of a smaller diameter flagpole, and the second set is configured to receive and secure a portion of an outer cylindrical surface of a larger diameter flagpole, relative to the first set.

In another preferred embodiment, where the projections of the first set are characterized as having a length greater than the length of the projections of the second set as noted above, such that the first set is configured to engage smaller diameter flagpoles and the second set is configured to engage larger diameter flagpoles, relatively, then at least one planar surface is preferably scored along the proximal base of the first set of longer projections, such that the scored projections are configured to break away from the body of the flag stopper upon the flag stopper receiving a flagpole having a large diameter which exceeds what the first set of longer projection can accommodate. In effect, the flagpole breaks away the longer projections of the flag stopper and is then securely engaged within and held by the shorter projections of the same flag stopper. In such manner, a single flag stopper can accommodate a multitude of various sizes of flagpoles, through embodiments of the present invention.

In yet another embodiment, the flag stopper also has a slit in the ring of its body. The slit extends from the outer portion of the planar body to the inner portion, thereby dividing and forming opposing coplanar sides of the planar body, such that the flag stopper body is configured to flex in longitudinally opposed directions to provide for the passage of the flagpole therebetween and then retract back into a coplanar position such that the plurality of inward projections firmly engage a portion of the circumference of the flagpole when it is received in the flag stopper. The slit is preferably oriented perpendicular to the periphery of said body.

As disclosed herein, it can be appreciated that the flag stopper preferably extends radially outwardly from the flagpole when coupled to it and retained by it, extending outward along a plane transverse to the flagpole, to retain a flag upon the flagpole. In such manner, the flag stopper prevents the flag from slipping or sliding off of the flagpole during windy conditions.

In a preferred embodiment, at least one planar surface is engraved along the outer portion of the planar body of the flag stopper for ornamentation.

The flag stopper is preferably of a unitary construction forged from a material selected from a group consisting of plastic, resin, polypropylene, high-density polyethylene, rubber, and steel.

In yet another embodiment, a flag stopper is provided having a generally planar body that has round aperture through it. Such round aperture has an inner aperture surface comprising an inner aperture coupler. In such embodiments, the flag stopper has an interchangeable inner ring having an outer surface and an inner surface, and the outer surface has an outer surface coupler. Preferably, the outer surface coupler and inner aperture coupler are matched up to prevent the interchangeable inner ring from separating from the planar body. The interchangeable inner ring should be coaxially aligned with the round aperture. The interchangeable inner ring is preferably configured to surround and firmly engage a portion of an outer surface of the cylindrical flagpole when it is received therein.

In a preferred embodiment, the interchangeable inner ring defines a plurality of evenly spaced radially outwardly extending slits. The slits preferably extend outwardly from the inner surface of the ring. The inner ring is thus configured to firmly engage the circumference of a cylindrical flagpole having diameters of various sizes. In other words, the interchangeable inner ring is configured to firmly engage various size flagpoles having various sized diameters.

In this embodiment, the overall orientation of the outer surface of the planar body may be configured in one of a number of different shapes, such as a circle, oval, square, rectangle, octagon, pentagon, decagon, triangle, heart, star, and fleur-de-lis.

Surprisingly, the inventor has found that when a flag stopper is provided according to a aspects of the present invention, the flag stopper has a combination of good mechanical strength and structural integrity, with good flag retention and, at the option of the user, may provide either short or long term retention for a flagpole. Due to the structure and orientation of embodiments of the flag stopper devices disclosed herein, the device when used contains very little material and weight, making it easily portable by a user from one location to another yet firmly stable upon thrusting, positioning, or repositioning upon the flagpole.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which:

FIG. 2C is a perspective view thereof showing an embodiment in a flexed position and showing an exemplary flagpole;

FIG. 2D is a perspective view thereof showing two exemplary elongated legs of an embodiment in a flexed position and showing an exemplary flagpole;

FIG. 15 is a perspective view of another embodiment and an exemplary flagpole and flag;
and
FIG. 16 is a perspective view of embodiments showing an exemplary interchangeable head in a disjoined position.

DETAILED DESCRIPTION

Figure 1:
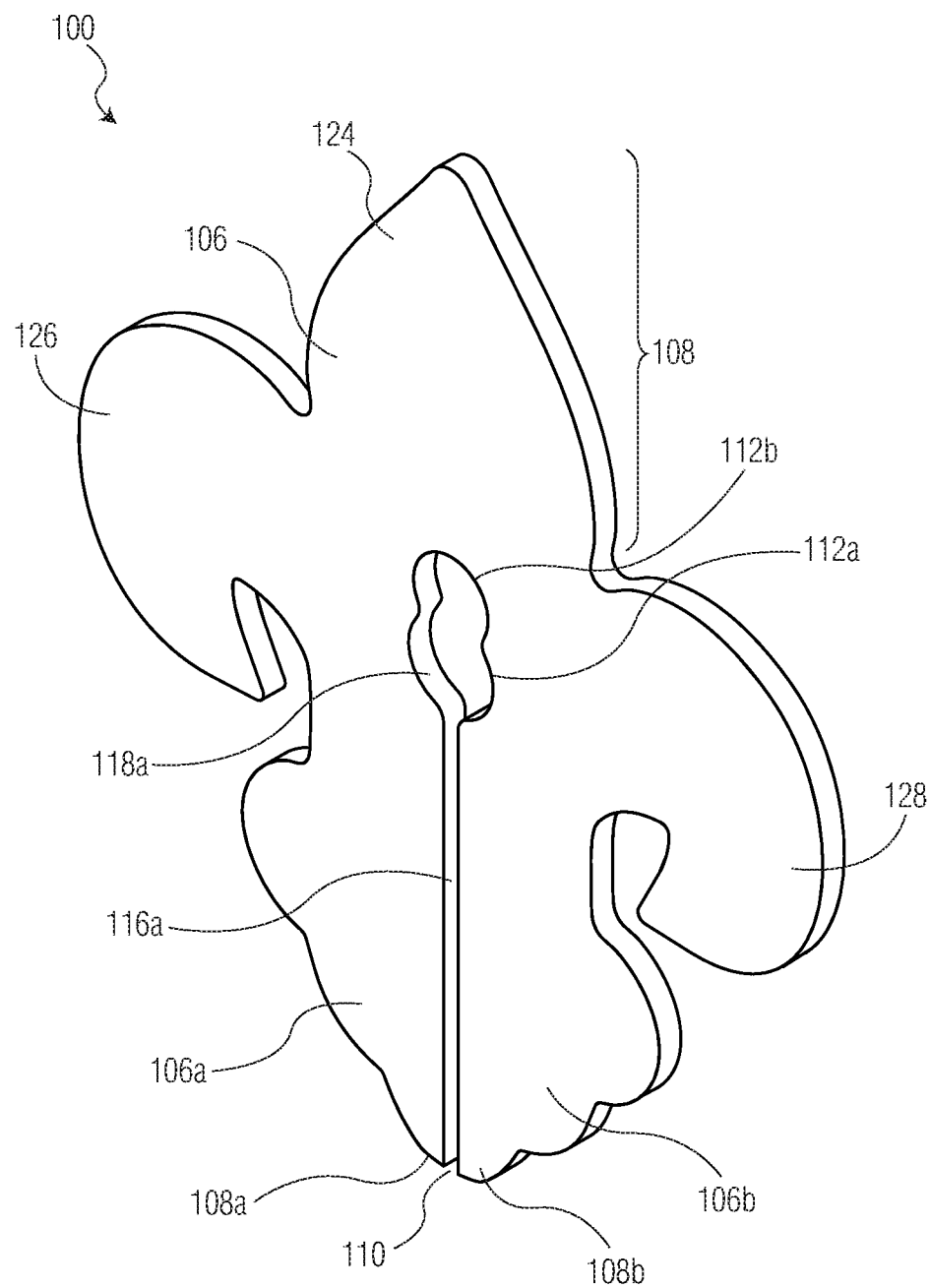
FIG. 1 is a perspective view of an exemplary flag stopper apparatus.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

For purposes of clarity and orientation with respect to a person, referred to herein as a user, it is noted that a transverse (also known as axial or horizontal) plane is an X-Z plane, parallel to the ground. A frontal (also known as coronal) plane is a Y-X plane, perpendicular to the ground, which separates the anterior from the posterior, the front from the back. A sagittal (also known as lateral) plane is an Y-Z plane, perpendicular to the ground, which separates left from right. Objects are coplanar if they all lie in the same plane. For example, one axis is coplanar with another axis when the two axes lie in the same plane.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, glass, metals, alloys, paper, board, resins, and coatings.

Reference will now be made in detail to the present preferred embodiments of the invention, examples of which are illustrated in the accompanying drawings. Wherever possible, the same reference numerals are used in the drawings and the description to refer to the same or like parts.

Figure 2A:
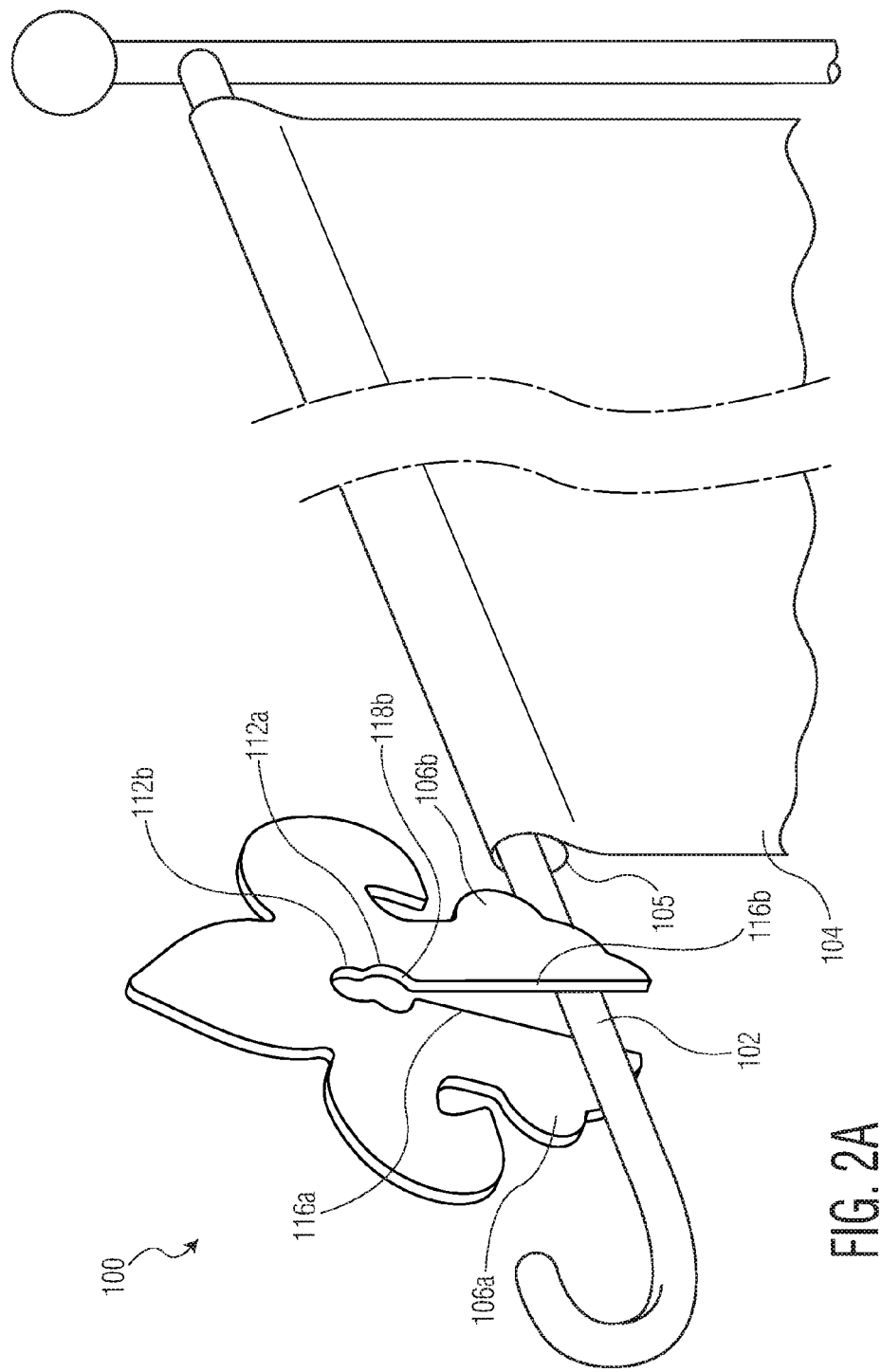
FIG. 2A is a perspective view thereof showing an embodiment in a flexed position and showing an exemplary flagpole and flag.
Figure 2B:
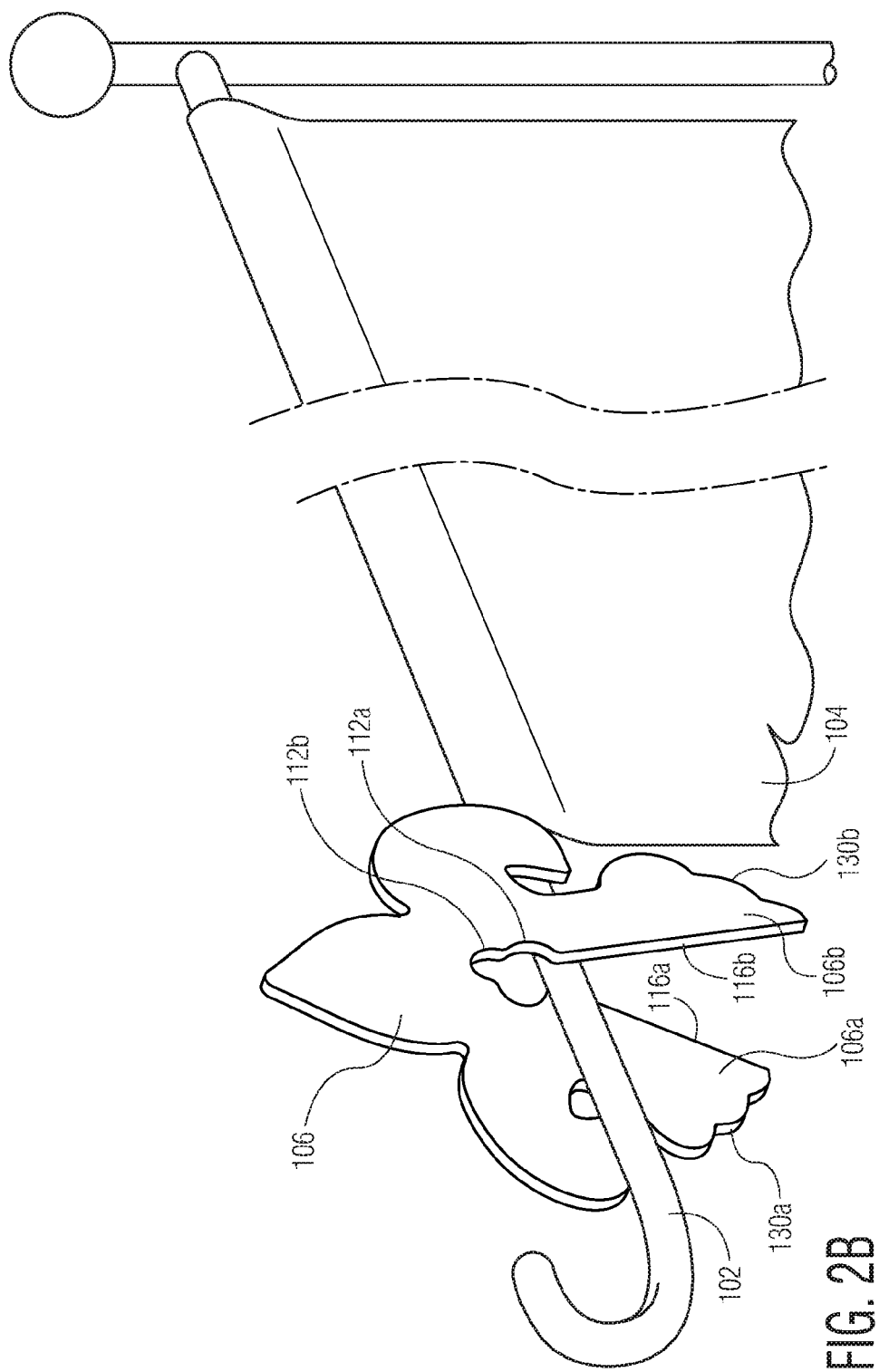
FIG. 2B is perspective view thereof showing an embodiment in a flexed position and showing an exemplary flagpole and flag.
Figure 3:
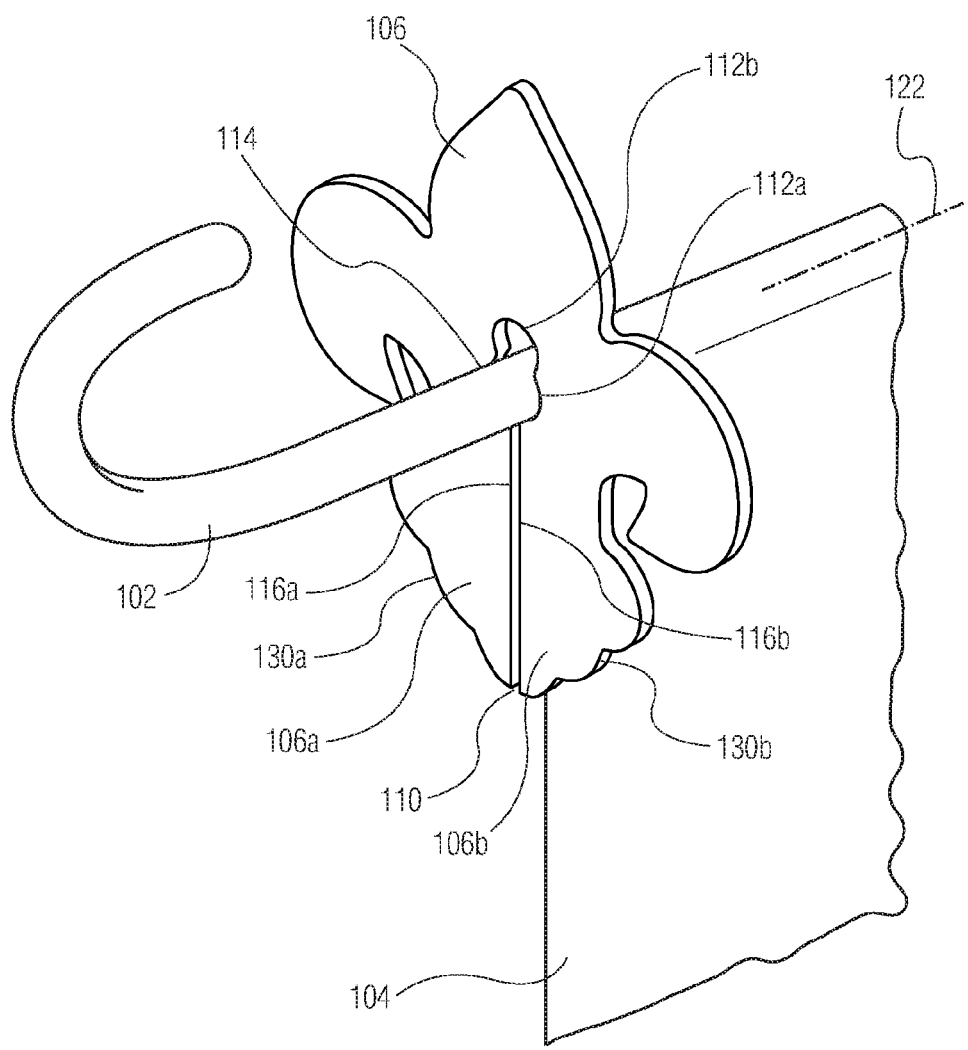
FIG. 3 is a perspective view of an embodiment and an exemplary flagpole and flag.

Referring initially to FIGS. 1-3, the basic constructional details and principles of operation of one embodiment of a flag stopper apparatus 100 for receiving a flagpole 102 for retention of a flag 104 on the flagpole 102 according to a preferred embodiment of the present invention will be discussed. A flexible banner, in the form of a flag 104, is generally indicated as rectangular in shape and often includes a sleeve 105 (or a grommet or equivalent) through which the flagpole 102 slides and extends there through to uphold the flag 104, as illustrated in FIG. 2A.

In FIG. 1, a flag stopper apparatus 100 according to a preferred embodiment of the present invention is provided in perspective view. The flag stopper 100 preferably comprises an elongated planar body 106, where the planar body 106 has a pair of elongated legs 106a, 106b in coplanar alignment with each other. The location of the planar body 106 where the legs 106a, 106b are connected may be referred to as a proximal portion 108 and the opposing ends as a distal portion 108a, 108b. As illustrated in FIG. 1, the pair of elongated legs 106a, 106b preferably define along the full length of said legs 106a, 106b a narrow and elongated slot or slit 110 in direct communication with a plurality of large round tiered apertures 112a, 112b of preferably decreasing size, defined by the planar body 106. In other words, in a preferred embodiment, aperture 112b is characterized as having a radius smaller than the radius of aperture 112a, as illustrated in FIGS. 1-3. Two-tiered apertures 112a, 112b are illustrated in the exemplary planar body 106 of the flag stopper 100 in FIGS. 1-3, yet the planar body 106 could, alternatively, define three-tiered apertures, four-tiered apertures, or five-tiered apertures of decreasing size (not shown), in embodiments of the present invention. In yet another embodiment, the tiered-apertures (e.g., 112a, 112b) could, alternatively, be configured as increasing in size.

As seen in FIG. 1, the pair of elongated legs 106a, 106b have inner surface walls 116a, 116b, extending from the distal portion 108a, 108b toward the proximal portion 108 of the planar body 106, and transitioning into inner surfaces walls 118a, 118b of the tiered apertures 112a, 112b at the proximal portion 108 of the planar body 106.

As illustrated in FIG. 3, the tiered apertures 112a, 112b of the planar body 106 are preferably sized and communicatively configured such that the inner surface walls 116a, 116b of the tiered apertures 112a, 112b firmly receive and secure or grab a portion of an outer cylindrical surface 114 of a large diameter flagpole 102 and alternatively a small diameter flagpole (not shown), respectively. In other words, in one embodiment, a large diameter flagpole 102 will securely fit within the larger aperture 112a, while a smaller diameter flagpole will move pass the larger aperture 112a and securely fit within a smaller aperture 112b.

Referring to FIGS. 2A-2D, in a preferred embodiment, the exemplary planar body 106 is configured with a coplanar pair of elongated planar legs 106a, 106b having a sufficient height, width, and modulus of elasticity for the elongated planar legs 106a, 106b to flex longitudinally away from each other by, for instance, an external force applied by a user's hand or hands. For example, referring to FIG. 2D, a user can position the planar body 106 in a first position that is transverse to the flagpole 102, then twist the coplanar pair of legs 106a, 106b in opposing directions as illustrated by arrows A and B. In embodiments of the invention, such twisting (arrows A and B) of the coplanar pair of elongated planar legs 106a, 106b provides a passageway 120 for a flagpole between the legs 106a, 106b and into one of the tiered apertures 112a, 112b, as illustrated in FIG. 2D. While the twisted planar legs 106a, 106b provides a passageway 120 for the flagpole 102, the user can position the twisted planar body 106 upon the flagpole 102, as seen in FIG. 2D. In such preferred embodiment, when the user releases the force of the user's twisting grasp (illustrated by exemplary arrows A and B) being exerted on the pair of elongated planar legs 106a, 106b, the elongated planar legs 106a, 106b automatically retract back (arrows C and D in FIG. 2D), or snap back, into the respective original coplanar position relative to each other 106a, 106b, as seen in FIG. 3, such that one of the tiered apertures 112a, 112b contracts around an opposing portion of the outer cylindrical surface 114 of the flagpole 102. As illustrated in FIGS. 2A-3, the elastic deformation of the flag stopper 100 is self-recoverable in the directions illustrated by arrows C and D in FIG. 2D when the stresses exerted by the forces are removed, such that the flag stopper 100 is self-recoverable to an upright coplanar position upon release of the external forces, in embodiments of the present invention. The flag stopper 100 may be easily positioned and/or repositioned upon a flagpole, at the option and intention of the user, without complex assembly and setup, through embodiments of the present invention.

In other words, the elongated legs 106a, 106b are preferably configured to flex longitudinally away (arrows A and B in FIG. 2D) from each other by a user twisting the elongated legs 106a, 106b in opposing directions about the proximal portion 108 of the planar body 106, to provide for passage of a flagpole 102 between the elongated legs 106a, 106b, and then retract back (arrows C and D in FIG. 2D), or snap back, into position so as to firmly contract around the outer surface of the flagpole 102, such that the planar body 106 of the flag stopper 100 thereby extends radially outwardly from the flagpole, preferably along a plane that is transverse to a central axis 122 of the flagpole 102, to retain a flag 104 upon the flagpole 102 while the flag stopper 100 is detachably coupled to and secured upon the flagpole 102. In such preferred embodiments, the planar body 106 of the flag stopper 100 is characterized as having a planar area extending sufficiently outward, or radially outwardly, from the flagpole 102 so as to have a radius that is larger than a radius of the sleeve 105 of the flag 104. In such embodiments, the sleeve 105 cannot slide over the planar body 106 of the flag stopper 100 which extends radially outwardly from the flagpole 102, thereby restraining horizontal (or axial) movement of the flag upon the flagpole 102. Through such embodiments, the sleeve 105 of the flag 104 and the body 106 of the flag 104 are prevented from sliding over the flag stopper 100 when horizontal forces are exerted upon the flag 104 by winds and gusts, as illustrated in FIG. 3.

Embodiments of the present invention utilize the work-energy principle for elastic materials, that is, the fact that the work done by external forces such as a user's hands is stored as elastic energy. Strain energy is stored in an elastic material upon deformation, and in embodiments of the present invention, strain energy may be stored in the planar body 106 including the elongated planar leg portions 106a, 106b of the planar body 106. The external work undertaken on an elastic proximal portion 108 of the flexible planar body 106 and the planar leg portion 106a, 106b in causing each to distort from its originally unstressed state is transformed into strain energy which is a form of potential energy. The strain energy in the form of elastic deformation is mostly recoverable in the form of mechanical work, and in embodiments of the present invention the recoverable form of mechanical work is exemplified in restoring each elongated planar leg portion 106a, 106b of the flag stopper 100 to its original coplanar position relative to the other planar leg portion 106a, 106b and hence restoring the planar body 106 106 to the its originally intended position and orientation accordingly.

Preferably, each elongated leg preferably has a flat and straight inner surface portion 116a, 116b configured to guide the flagpole toward the tiered apertures when the legs 106a, 106b of the flag stopper 100 are pressed against the flagpole.

Referring to FIG. 2C, one exemplary manner of detachably connecting a flag stopper according to embodiments of the present invent is provided. The flag stopper 100 may first be positioned transverse to the flagpole such that the slit 110 is directed toward the central axis 122 of the flagpole. When the elongated legs 106a, 106b of the distal portion 108a, 108b of the planar body 106 of the flag stopper 100 are depressed against the flagpole, only one of the elongated legs 106a flexes longitudinally to provide for the passage of the flagpole 102 between the legs 106a, 106b and into one of the tiered apertures. As seen in FIG. 2C, while one elongated leg 106a flexes longitudinally, the other elongated leg 106b remains straight and unflexed and thus serves as a guide for the flagpole 102, guiding the flagpole 102 toward the tiered apertures 112a, 112b as the planar body 106 is pressed against the flagpole 102 by the user. As a result of the combination of the structural configuration of the elongated planar legs 106a, 106b, the respective nature of the elastic deformation of one of the elongated legs 106a related to such configuration, and the straight and unflexed state of the other elongated leg 106b, the flexed leg 106a automatically snaps into coplanar position with its opposing leg 106b thereby contracting around the flagpole when the flagpole reaches the tiered apertures 112a, 112b, as a result of the release of pressure between the legs 106a, 106b and the flagpole due to the radius of the apertures 112a, 112b having a size that is larger than the size of the slit 110.

Figure 4A:
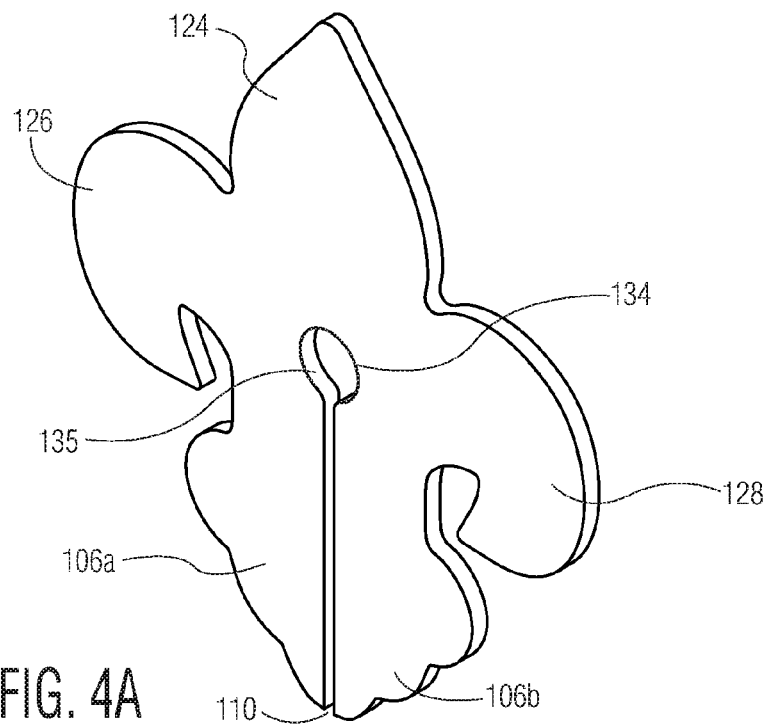
FIG. 4A is a perspective view of an embodiment.
Figure 4B:
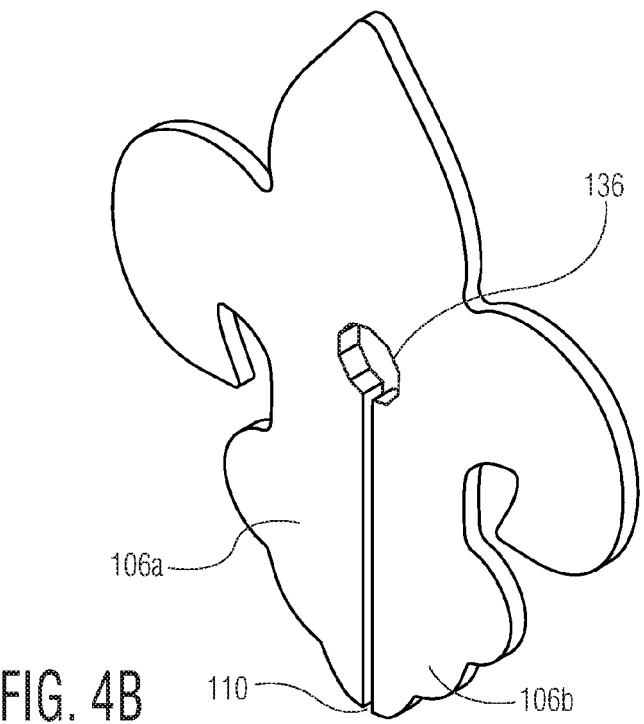
FIG. 4B is a perspective view of an embodiment

In another embodiment, the planar body 106 of the flag stopper defines a single rounded aperture 134 in open communication with the slot 110 as illustrated in FIG. 4A, for receiving and firmly grasping the flagpole 102. In such embodiment, the receiving aperture 134 provides an inner surface area 135 that would wrap nearly entirely around the outer cylindrical surface 114 of a flagpole 102. In yet another embodiment, the planar body 106 of the flag stopper preferably defines a single primarily octogonal-shaped aperture 136 in open communication with the slot 110, as illustrated in FIG. 4B.

In a preferred embodiment, the elongated planar body 106 of the flag stopper 100 is a single piece of unitary construction in the shape of a fleur-de-lis, as seen in FIGS. 1-4B. The shape of the fleur-de-lis preferably forms three pedals 124, 126, 128, such that the centered pedal 124 is configured to receive a grasp of a user.

In such embodiments, each elongated leg preferably has a flat inner surface portion 116a, 116b respectively opposing a laterally extending outer surface portion 130a, 130b of tiered orientation, as illustrated in FIGS. 1-4B. Such outer surface portions 130a, 130b are configured to receive a grasp of a user and be flexed longitudinally apart by the user (for instance, illustrated by arrows A and B in FIG. 2D), thereby allowing one of the tiered apertures 112a, 112b to receive the flagpole and contract around the flagpole upon the release of the outer surface portions 130a, 130b of the elongated legs 106a, 106b by the user.

In one embodiment, each elongated leg 106a, 106b of the flag stopper 100 is characterized as having a length sufficient to extend along an opposing surface of each respective side of a flag 104 that is firmly disposed and secured between the opposing inner surfaces 116a, 116b of the elongated legs 106a, 106b, and thus, the elongated legs 106a, 106b thereby provide resistance against axial movement (along the flagpole) and lateral movement (rotating around the flagpole) of the flag when forces are imparted on the flag by winds or gusts. In such embodiments, the elongated legs 106a, 106b are preferably characterized as having a length either equal to or greater than the length of the flag.

In FIG. 3, the elongated legs 106a, 106b are shown as having a length shorter than the length of the flag 104. In another embodiment (not shown), the elongated legs 106a, 106b are characterized as having a length either equal to or greater than the length of the flag.

In a preferred embodiment, the body 106 of the flag stopper 100 is a single piece of a homogenous material, allowing for economical fabrication and efficient use of the flag stopper 100.

Referring to FIGS. 5-9C, the basic constructional details and principles of operation of other preferred embodiments of a flag stopper apparatus 200 for receiving and securely grasping a flagpole 102 according to a preferred embodiment of the present invention will be discussed.

Figure 5:
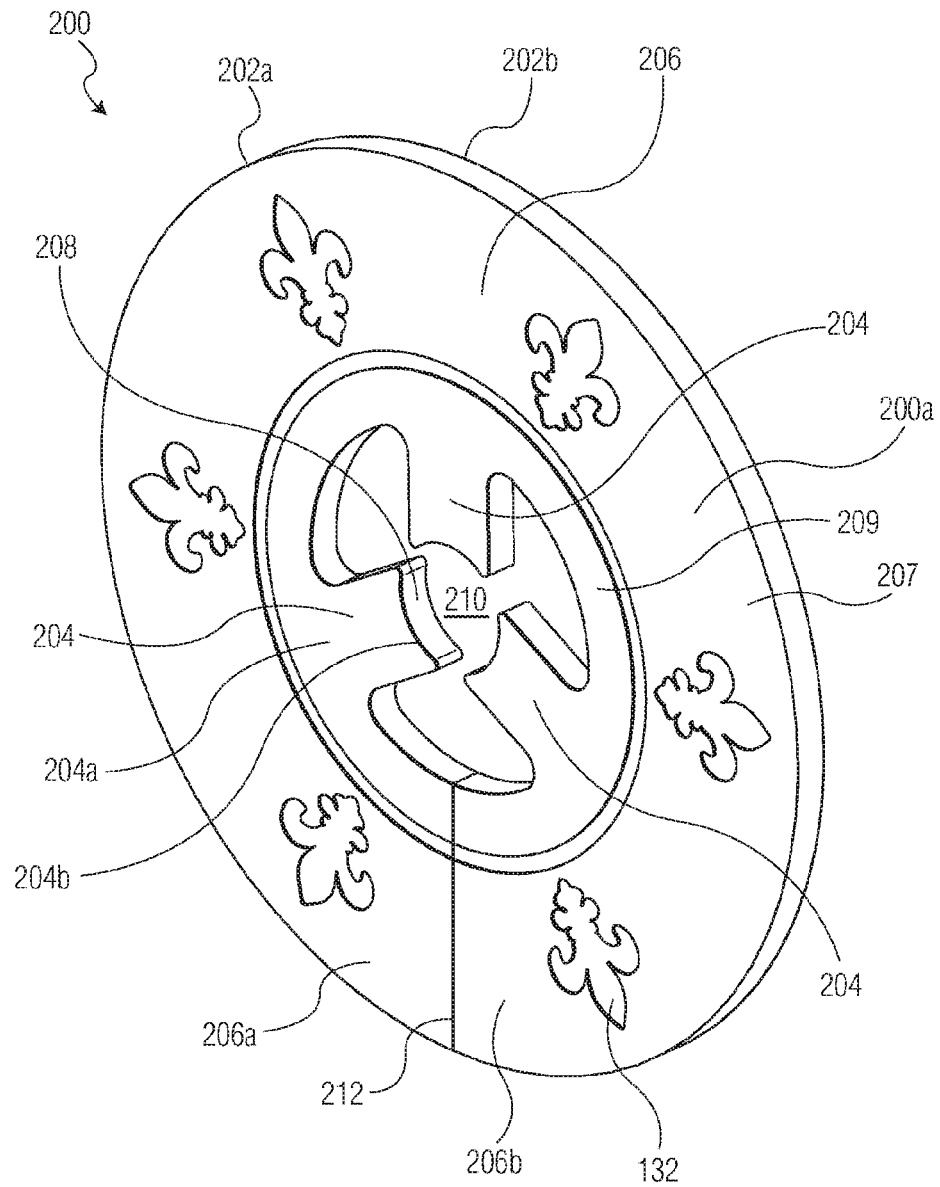
FIG. 5 is a perspective view of an embodiment.
Figure 6A:
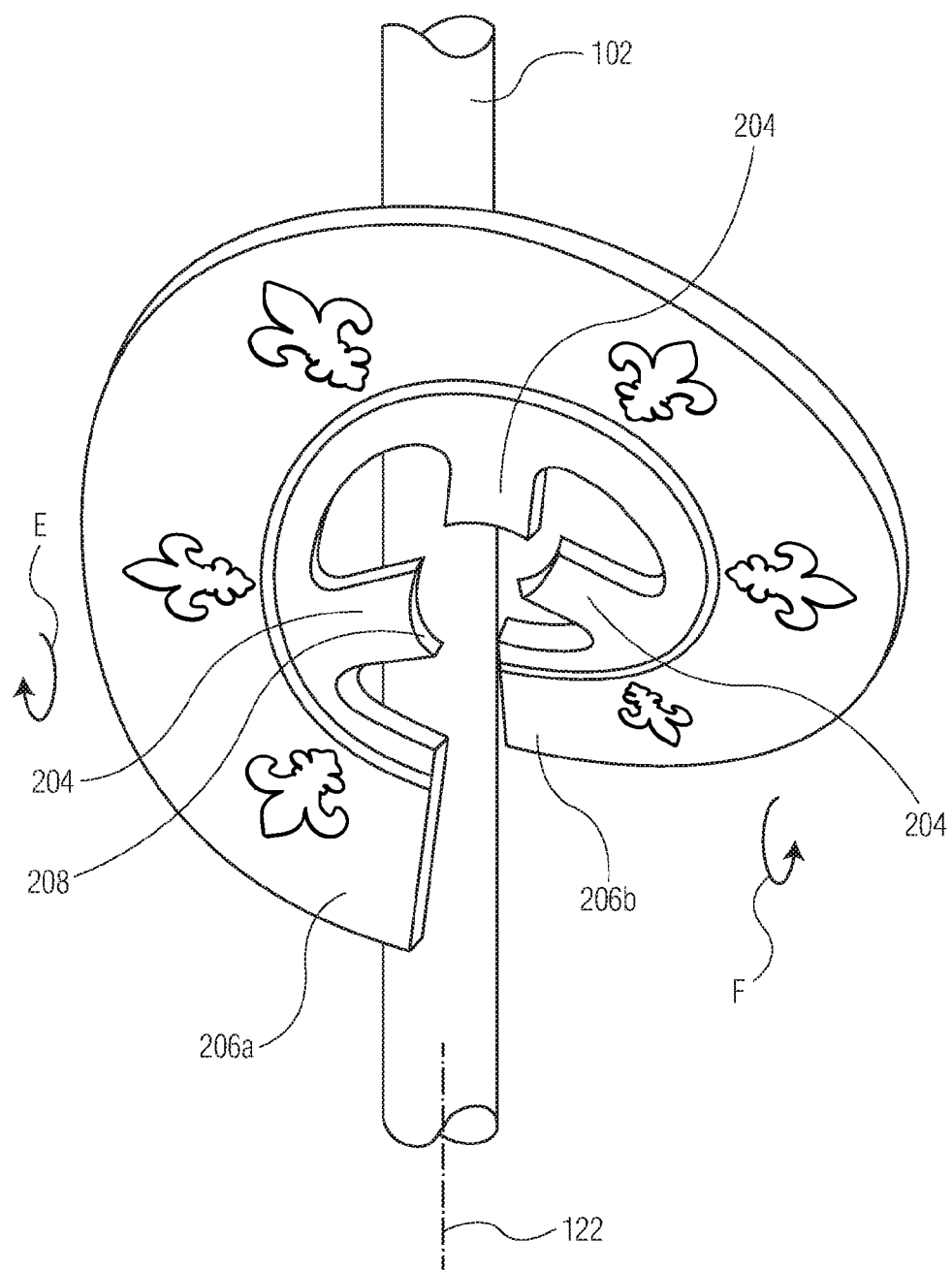
FIG. 6A is a perspective view of an embodiment and an exemplary flagpole.
Figure 6B:
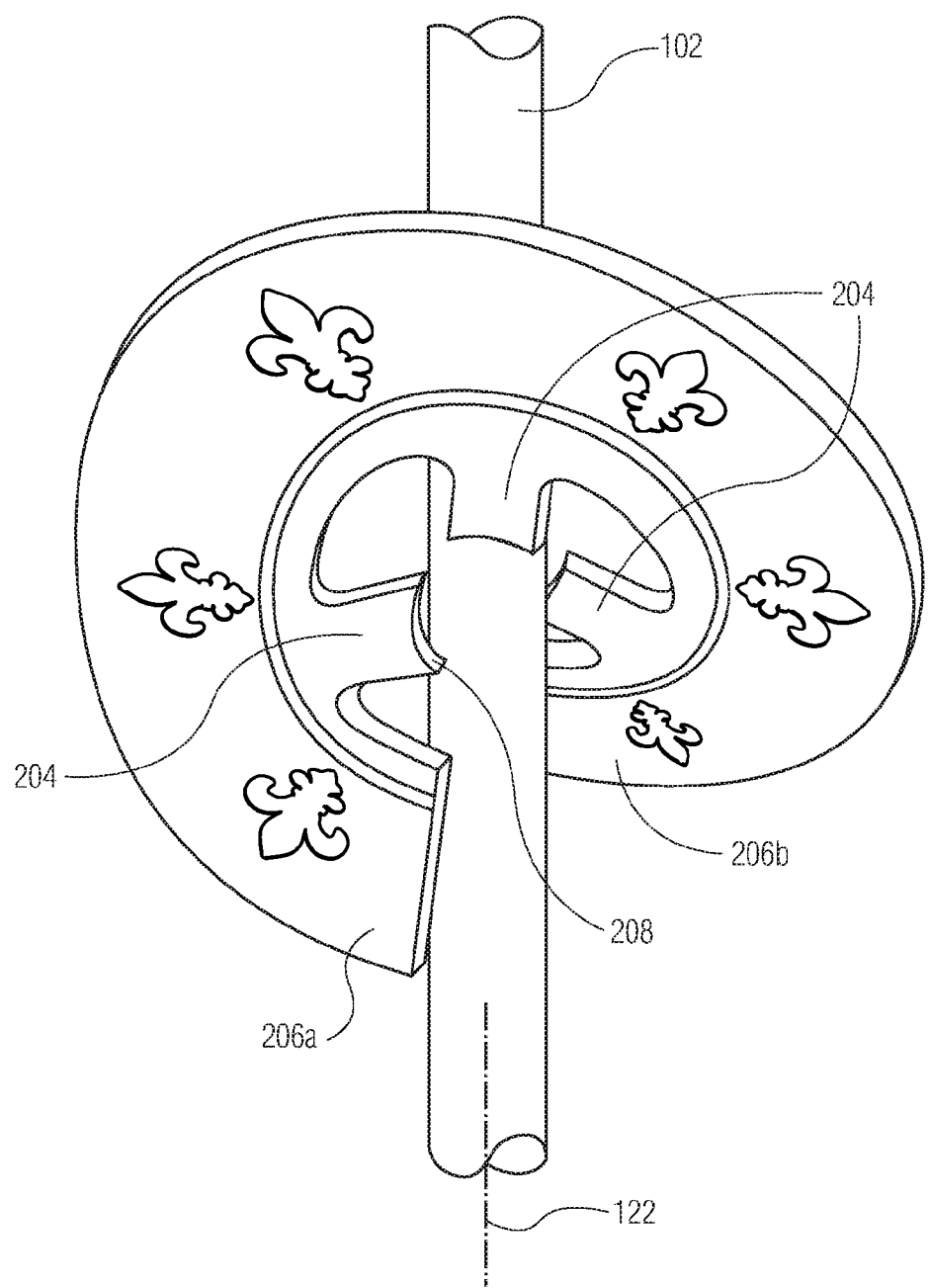
FIG. 6B is a perspective view of an embodiment and an exemplary flagpole.
Figure 7:
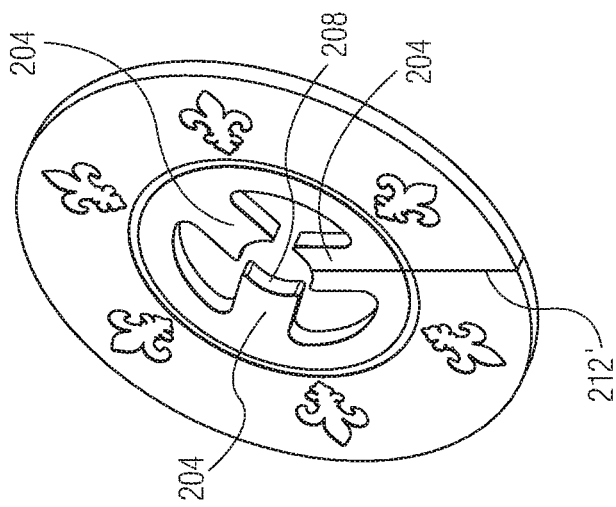
FIG. 7 is a perspective view of an embodiment.
Figure 6C:
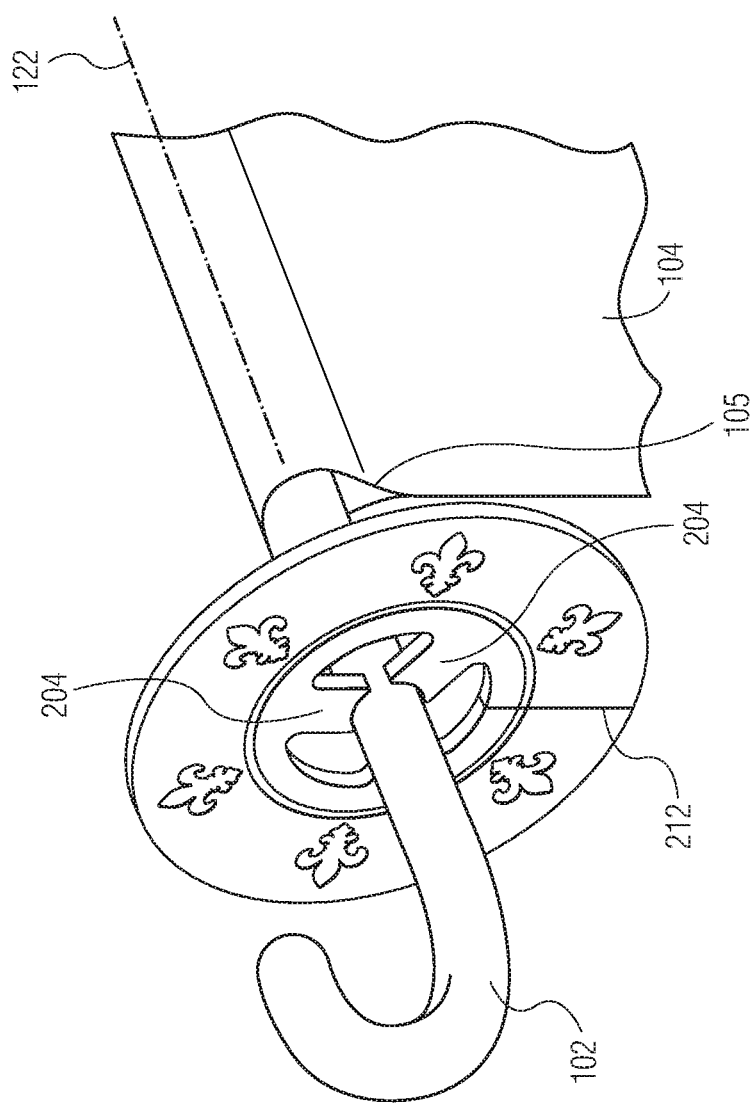
FIG. 6C is a perspective view of an embodiment and an exemplary flagpole and flag.

As illustrated in FIGS. 5-7, in another preferred embodiment, a flag stopper 200 is provided for use with a cylindrical flagpole 102 that is configured to retain a flag 104, where the flag stopper 200 has a round planar body 206 forming two opposing planar surfaces 202a, 202b. Such planar body 206 has an outer portion 206a relative to an inner portion 206b. In such embodiment, the body 206 defines a plurality of evenly spaced concentrically extending projections 204, where each projection extends inwardly from a proximal base portion 204a of the outer portion 206a of the planar body 206, to a distal end 204b of the projection 204 disposed near a center axis 210 of the inner portion 206b of the flag stopper 200. The distal or innermost end 204b of the projection 204 preferably defines an outwardly radially extending concave tip 208, such that the outwardly concave tips 208 of the plurality of projections 204 are configured in a circular manner as illustrated in FIGS. 5-7 to firmly engage a portion of the circumference 114 of the cylindrical flagpole 102 when the flagpole 102 is received between the projections as seen in FIG. 6C.

As disclosed herein, it can be appreciated that the flag stopper 200 preferably extends radially outwardly from the flagpole when coupled to and retained by the flagpole 102, thus extending radially outward along a plane transverse to the axis 122 of the flagpole as illustrated in FIG. 6C, to retain a flag 104 upon the flagpole 102. In such manner, the flag stopper 200 prevents the flag 104 from sliding along or slipping off of the flagpole 102 during windy conditions.

As seen in FIG. 5, in yet another embodiment, the round planar body 206 of the flag stopper 200 forms a slit 212 in a ring-like structure that is formed by the round planar body 206. The slit 212 extends from the outer portion 207 of the planar body 206 to the inner portion 209, thereby dividing and forming opposing coplanar sides 206a, 206b of the planar body 206, such that the flag stopper body 206 is configured to flex in longitudinally opposed directions (illustrated by arrows E and F in FIG. 6A) to provide for the passage of the flagpole between the opposing coplanar sides 206a, 206b of the planar body 206 as seen in FIG. 6A and FIG. 6B and then retract back into a coplanar position as seen in FIG. 6C such that the plurality of inward projections 204 firmly engage a portion of the circumference of the flagpole 102 when the flagpole 102 is received in the flag stopper 200. In such manner, the flag stopper 200 may be easily positioned and/or repositioned upon a flagpole, at the option and intention of the user, without complex assembly and setup. The slit 212 is preferably oriented perpendicular to the periphery of the planar body 206 and is disposed in between two of the projections 204, as illustrated in FIG. 5. In another embodiment, the slit 212' is preferably oriented perpendicular to the periphery of the planar body 206 and the slit 212' is disposed in alignment with one of the perpendicularly inwardly extending projections 204 as illustrated in FIG. 7.

Referring to FIG. 5, at least one planar surface 202a is engraved along the outer portion 207 of the planar body 206 of the flag stopper 200 for ornamentation 132. The flag stopper 200 is preferably of a unitary construction forged from a material selected from a group consisting of plastic, resin, polypropylene, high-density polyethylene, rubber, and steel.

Figure 8A:
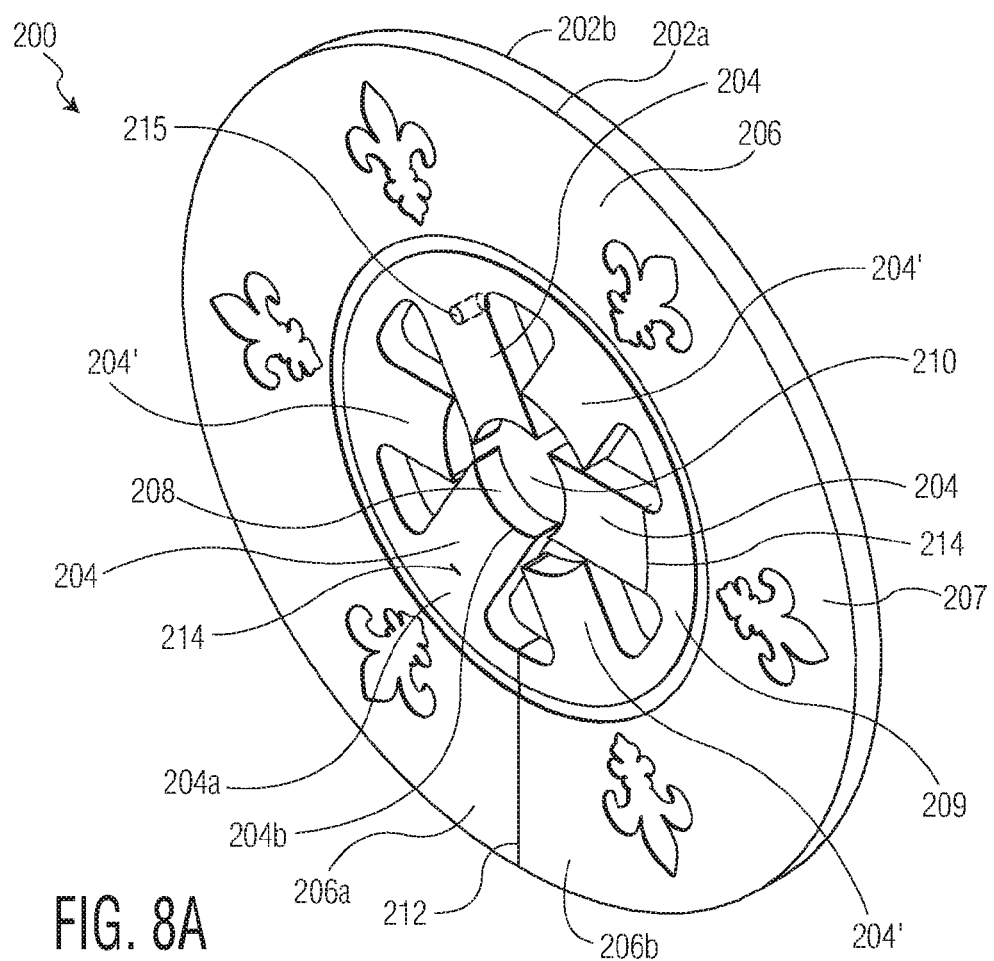
FIG. 8A is a perspective view of additional embodiments.
Figure 8B:
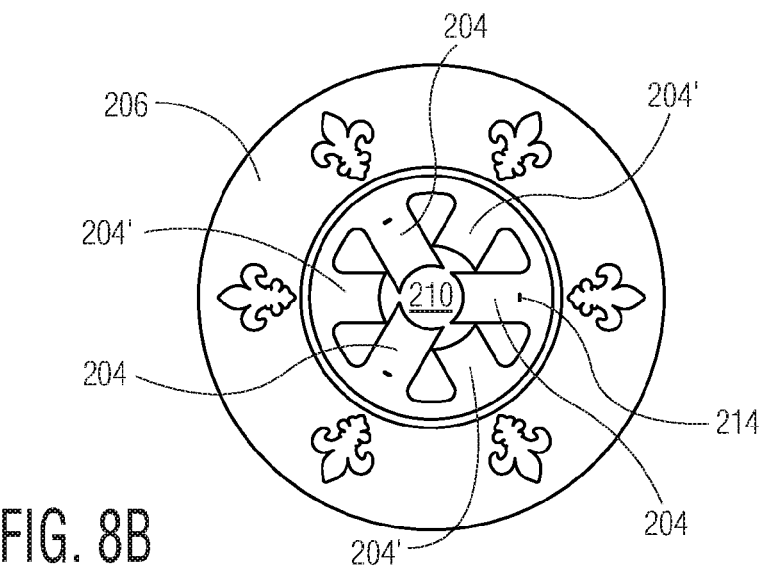
FIG. 8B is a front elevation view of embodiments, the rear elevational view being a mirror image of the front elevation view.

Referring to FIGS. 8A-8B, in yet another embodiment of the invention, the plurality of evenly spaced concentrically extending projections 204 includes a first set of at least two or more evenly spaced projections 204 preferably of equal length to one another in the first set, and also includes a second set of at least two or more evenly spaced projections 204' preferably of equal length to one another in the second set, such that the projections 204 of the first set are characterized as having a length greater than the length of the projections 204' of the second set.

In one preferred embodiment, the projections 204 of the first set are characterized as having a length greater than the length of the projections 204' of the second set, such that the first set of projections 204 is configured to firmly and removably receive and secure a portion of an outer cylindrical surface 114 of a smaller diameter flagpole, and the second set of projections 204' is configured to receive and secure a portion of an outer cylindrical surface 114 of a larger diameter flagpole 103, relative to the smaller diameter flagpole fitting the first set of projections 204, as exemplified in FIGS. 8A-8B.

Figure 9A:
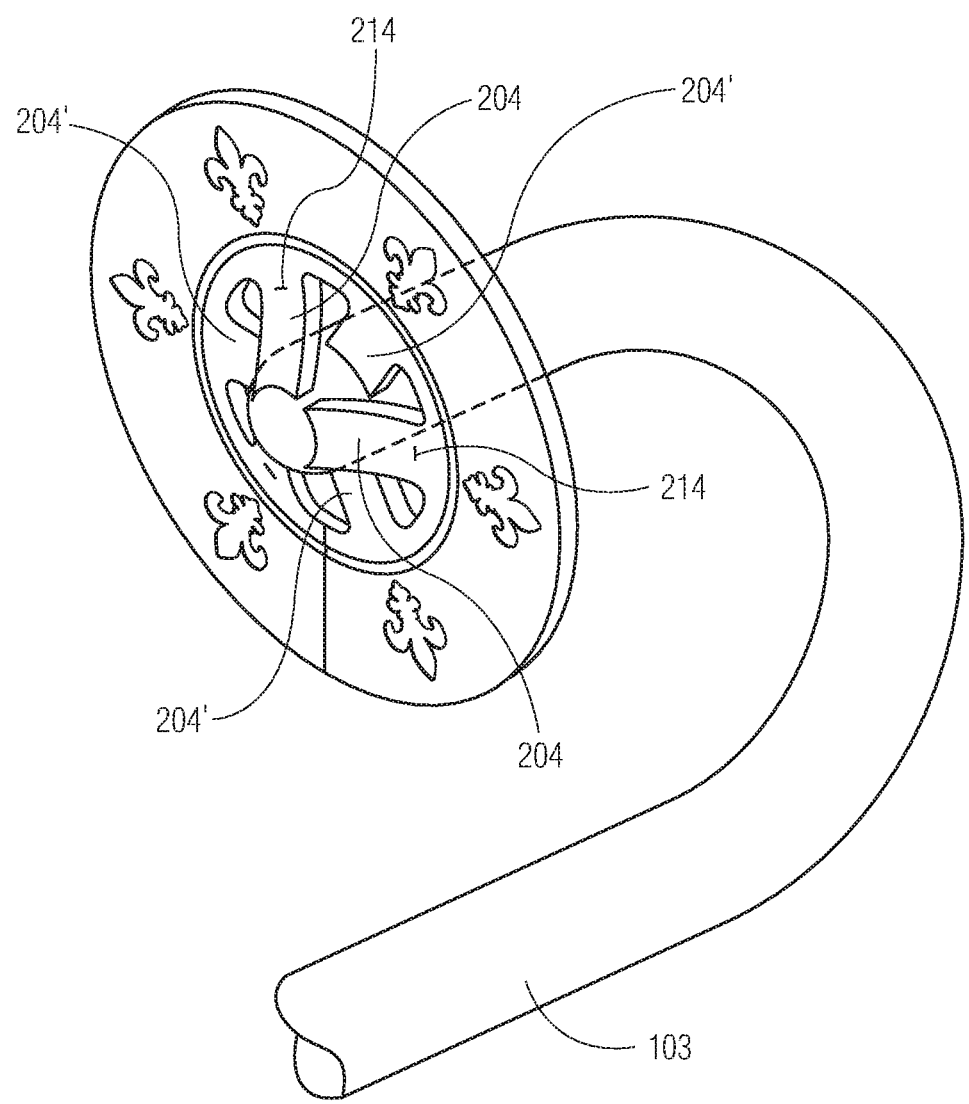
FIG. 9A is a perspective view of an embodiment and an exemplary flagpole.
Figure 9B:
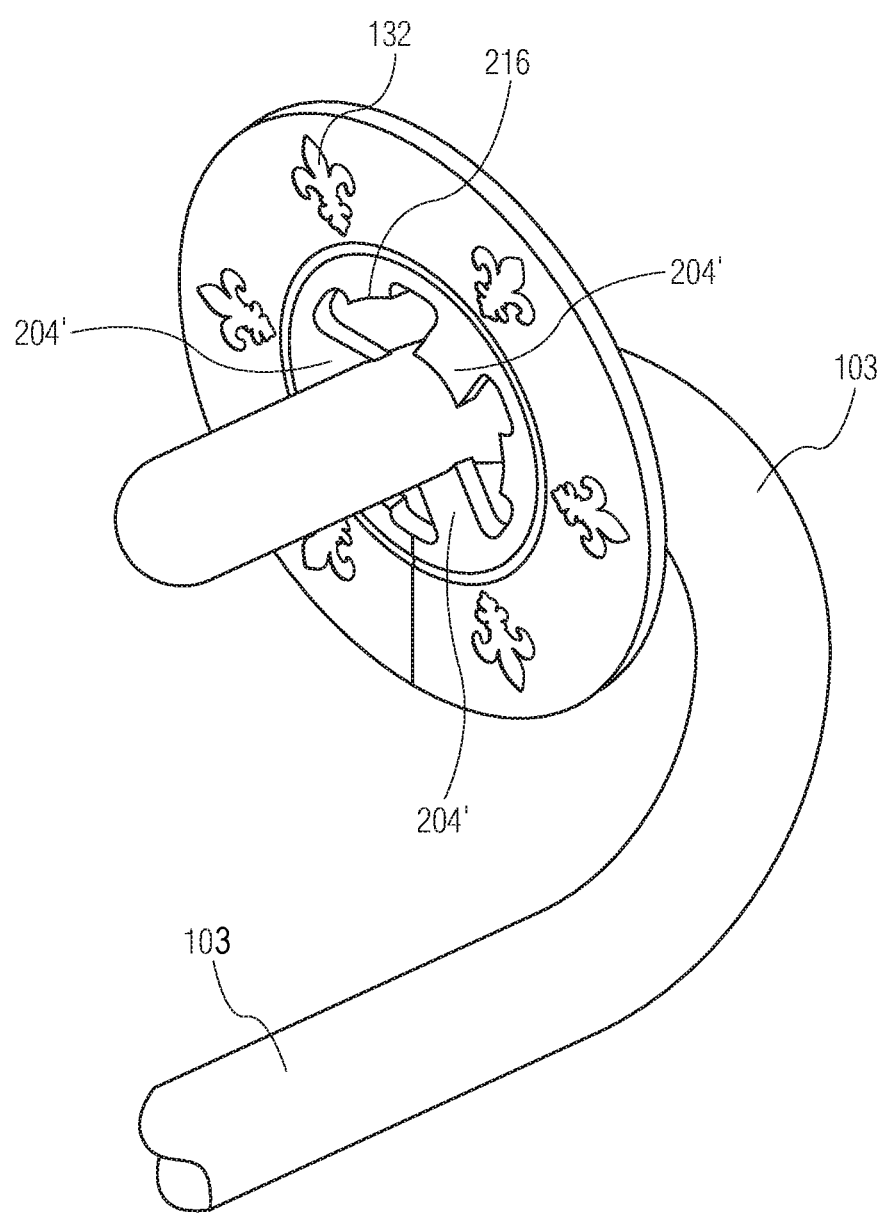
FIG. 9B is a perspective view of an embodiment and an exemplary flagpole.

Referring to FIGS. 9A-9B, in another preferred embodiment, the projections 204 of the first set are characterized as having a length greater than the length of the projections 204' of the second set as described above, such that the first set of projections 204 is configured to engage a smaller diameter flagpole and the second set of projections 204' is configured to engage a larger diameter flagpole, respectively; in such embodiment, at least one planar surface 202a (or 202b) is preferably scored 214 along the proximal base portion 204a of the first set of longer projections 204, such that the scored 214 projections 204 are configured to break away from the body 206 of the flag stopper 200 upon the flag stopper 200 receiving a flagpole 103 having a large diameter, meaning a diameter of which exceeds what the first set of longer projection can accommodate without breakage, as seen in FIG. 9A. The scoring 214 of the surface (e.g., 202a) of the projections 204 at a point along the proximal base portion 204a of the projections 204 of the planar body 206 partially weakens the projections 204 to facilitate breakage of the projections 204 from the planar body 206 of the flag stopper 200. As shown in FIG. 8A, such scoring 214 can be in the form of a shallow cutting of the surface (e.g., 202a) of the projection 204, or as an alternative to surface scoring, can be in the form of one or more small apertures 215 formed through the base portion 204a of the projection 204 so as to weaken the projection 204 to facilitate breakage thereof when intended, at a predetermined location within the projection 204, at the option of the user.

Figure 9C:
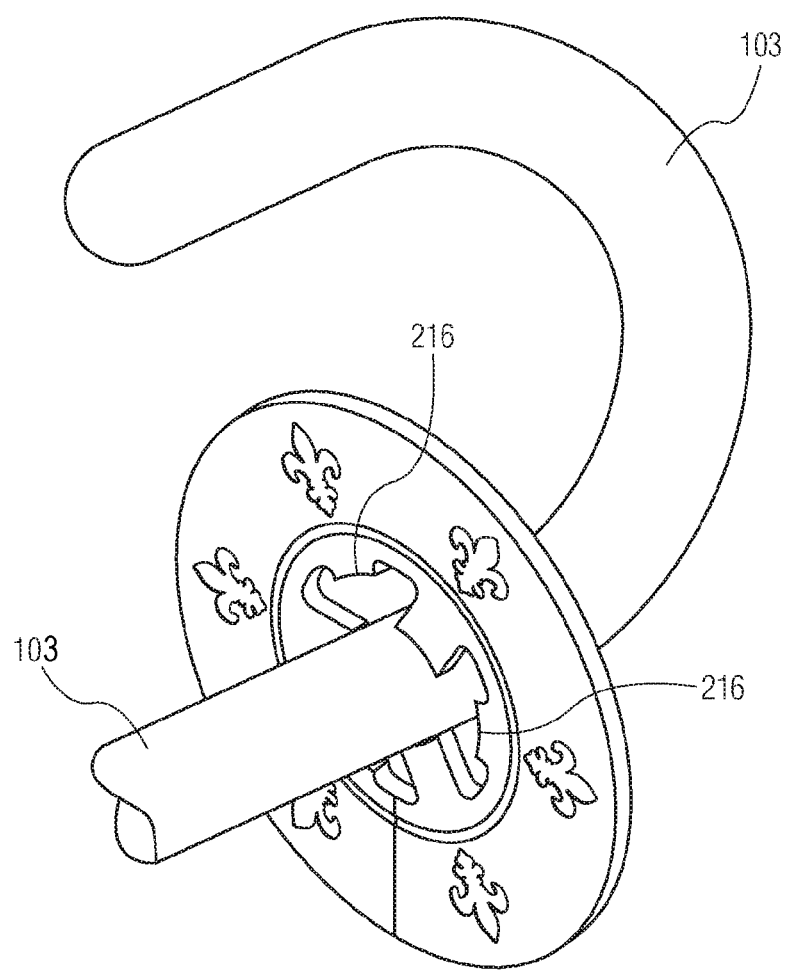
FIG. 9C is a perspective view of an embodiment and an exemplary flagpole.

In effect, as illustrated in FIG. 9A, the exemplary large diameter flagpole 103 breaks away (at 216) the longer projections 204 of the flag stopper 200 when the flag stopper 200 receives the exemplary flagpole 103, and thus the flagpole 103 is securely engaged within and held by the shorter projections 204' of the same flag stopper 200, as illustrated in FIG. 9B. In such manner, a single flag stopper 200 can accommodate a multitude of various sizes of flagpoles, through embodiments of the present invention. As shown in FIG. 9C, once the longer projections 204 have broken away (at 216) from the planar body 206 of the flag stopper 200, the flagpole 103 is securely engaged within and held by the shorter projections 204' of the flag stopper 200, and the flag stopper 200 can be moved, to the user's desired position of the flag stopper 200 along the flagpole 103, at the option of the user. It can be seen that the unique and novel flag stopper 200 of this invention exhibits superlative properties and capabilities over conventional devices, such as, for example, by providing for more universal application to flagpoles of varying orientation and of varying thicknesses, through embodiments of the present invention.

As seen in FIG. 8A, the round planar body 206 of the flag stopper 200 having sets of projections (e.g., 204, 204') of different lengths as disclosed herein preferably forms a slit 212 in a ring-like structure that is formed by the round planar body 206, and the slit 212 preferably extends from the outer portion 207 of the planar body 206 to the inner portion 209, thereby dividing and forming opposing coplanar sides 206a, 206b of the planar body 206, such that the flag stopper 200 body 206 is configured to flex in longitudinally opposed directions, at the option of the user. As seen in FIG. 8B, in another embodiment, the round planar body 206 of the flag stopper 200 having sets of projections (e.g., 204, 204') of different lengths as disclosed herein does not have a slit (i.e., there is no slit 212 in the planar body in FIG. 8B) in the ring-like structure that is formed by the round planar body 206.

Figure 10:
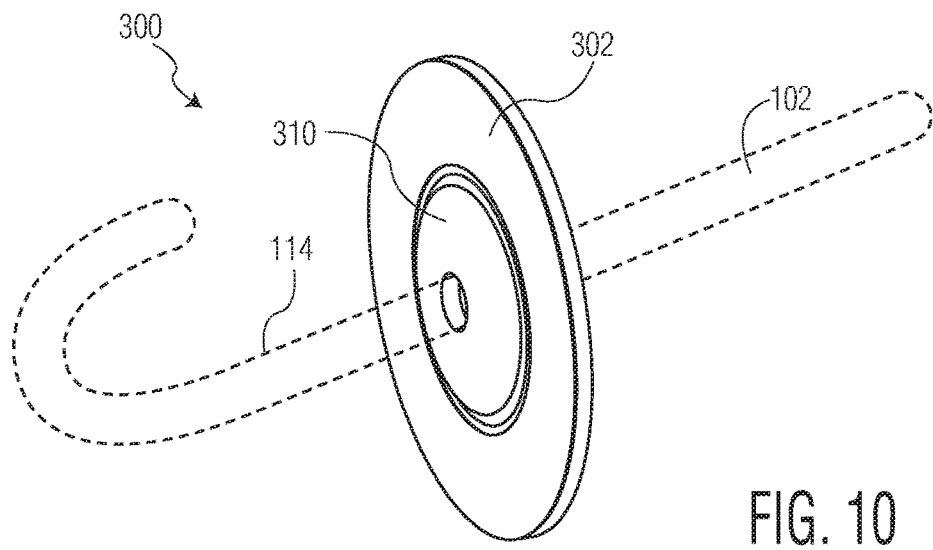
FIG. 10 is a perspective view of an embodiment and broken lines of an exemplary flagpole.

Referring to FIGS. 10-14, in yet another embodiment of the present invention, a flag stopper 300 is provided having a generally planar body 302 preferably defining a round aperture 304 disposed through the planar body 302. Such round aperture 304 has an inner aperture surface 306 comprising an inner aperture coupler 308. In such embodiments, the flag stopper 300 has an interchangeable inner ring 310 having an outer surface 312 and an inner surface 314, and the outer surface 312 forms an outer surface coupler 316. The interchangeable inner ring 310 defines a preferably centrally disposed aperture sized and adapted to receive and firmly secure a flagpole 102, as illustrated in FIG. 10.

Figure 11:
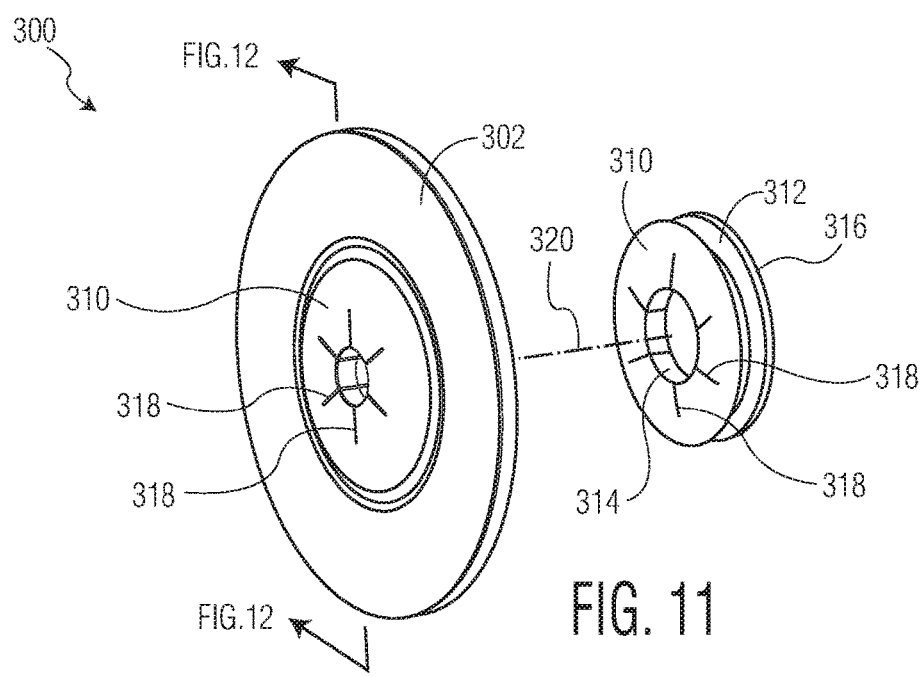
FIG. 11 is a perspective view of embodiments.

Preferably, the outer surface coupler 316 and inner aperture coupler 308 are matched up to prevent the interchangeable inner ring 310 from separating from the planar body 302, at the option and intention of the user. Preferably, the outer surface coupler portion 316 of the interchangeable inner ring 310 is generally U-shaped, having an open portion along its peripheral surface adapted to couple to the inner surface coupler portion 308 of the round aperture 304 defined by the planar body 302. The interchangeable inner ring 310 should preferably be disposed in coaxial alignment with the round aperture 304, around exemplary axis 320. The interchangeable inner ring 310 is preferably configured to firmly engage a portion of the outer surface 114 of the cylindrical flagpole 102 when the flagpole 102 is received within the inner ring 310. The aperture defined by the interchangeable inner ring 310 can be configured with a smaller diameter, or it can be configured with a larger diameter, at the option of the user, as illustrated in FIG. 11, so as to be sized and adapted to receive and firmly secure a flagpole 102. In other words, the interchangeable inner ring 310 is configured, at the option of the user, to firmly engage different size flagpoles having diameters of different sizes. For instance, an inner ring 310 having a small diameter aperture can be changed out with another inner ring 310 having a large diameter aperture, and either of the different inner rings 310 can be coupled to planar body 302.

Figure 12:
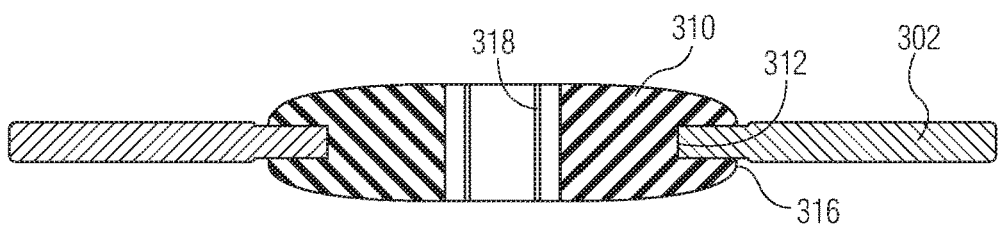
FIG. 12 is a cross sectional view along the cutting view 12-12 of FIG. 11, according to one embodiment.

Referring to FIGS. 11-12, the interchangeable inner ring 310 preferably defines a plurality of evenly spaced radially outwardly extending slits 318. The slits 318 preferably extend radially outwardly from the inner surface 314 of the inner ring 310. The inner ring 310 is thus configured to surround and firmly engage a portion of an outer surface 114 of a cylindrical flagpole 102 having diameters of various sizes, because the slits 318 of the inner ring 310 facilitate flexing of the inner ring 310 when receiving a flagpole 102. In other words, the interchangeable inner ring 310 is configured to firmly engage various size flagpoles having various sized diameters, through embodiments of the present invention. In one embodiment, the inner ring 310 is permanently fixed to the planar body 302 in a stationary manner, such as, for example by permanent glue or epoxy. In one embodiment, the inner ring 310 is constructed of rubber, and the planar body 302 is constructed of plastic. In yet another embodiment, the inner ring 310 structure is provided as a flag stopper 300 of unitary construction having a planar body configured to extend sufficiently radially outwardly from a flagpole 102 to retain a flag thereon.

Figure 13:
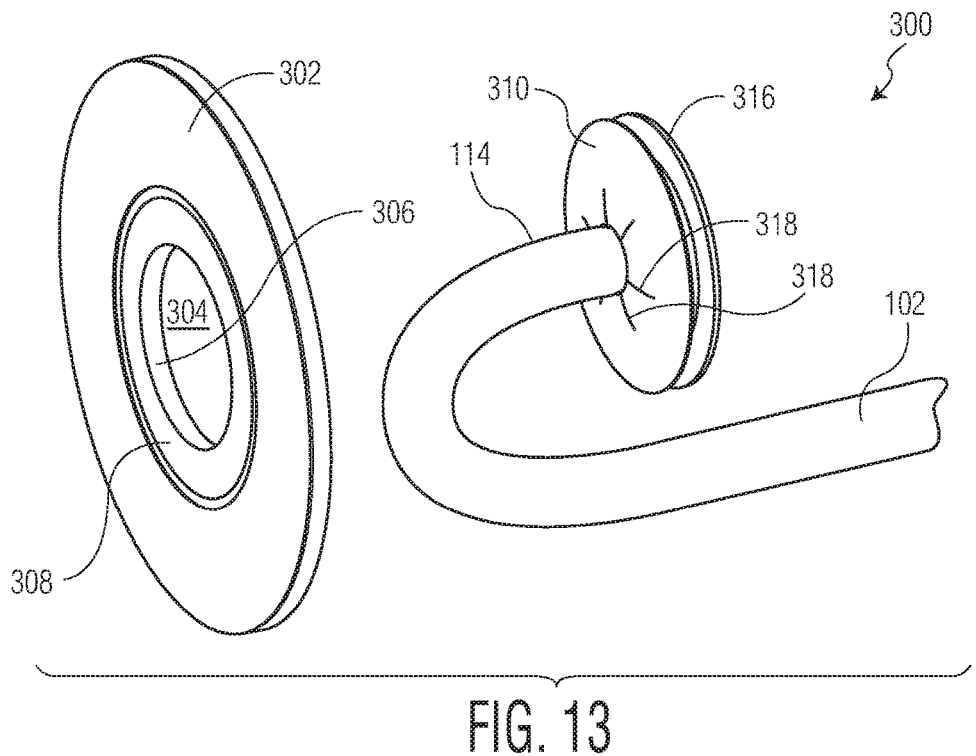
FIG. 13 is a perspective view of embodiments and an exemplary flagpole.
Figure 14:
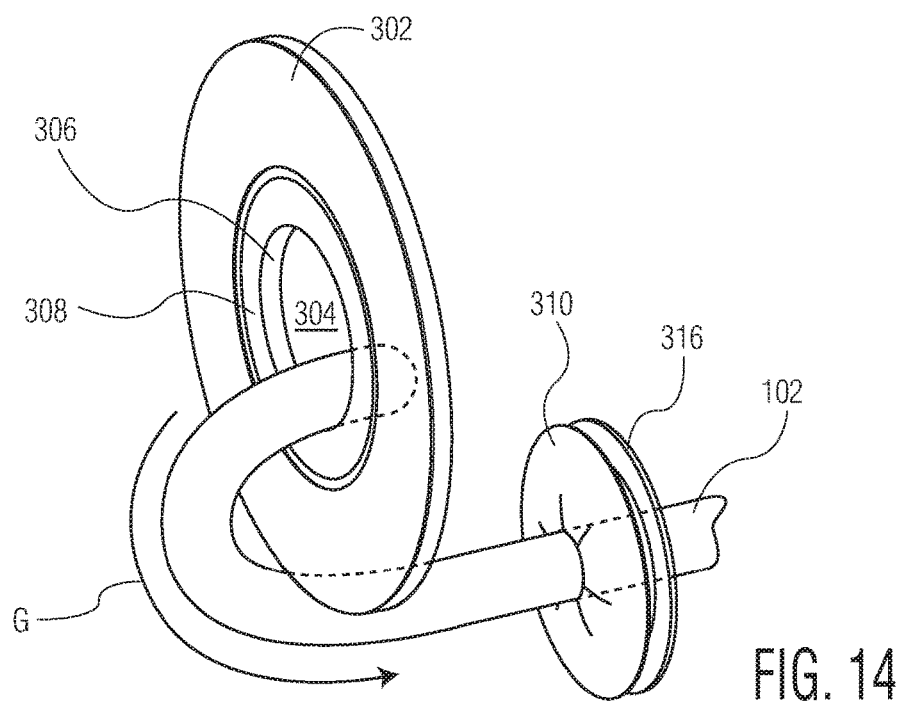
FIG. 14 is a perspective view of embodiments and an exemplary flagpole.

Referring to FIGS. 13-14, it is shown that embodiments of the invention disclose flag stoppers 300 capable of more universal application than conventional flag stoppers. As seen in FIG. 13, the inner ring portion 310 is first placed onto a flagpole 102 at a location on the flagpole 102 at which can only accommodate a smaller ring such as the inner ring portion 310. After the inner ring portion 310 is placed onto the flagpole 102, the flagpole 102 can thence be threaded (arrow G in FIG. 14) through the round aperture 304 of the outer planar body portion 302; and once threaded there through, the outer planar body portion 302 can be mated with and coupled to the inner ring portion 310.

Referring to FIGS. 10-14, in such embodiments, the overall orientation of the outer surface of the planar body may be configured in one of a number of different shapes, such as a circle, oval, square, rectangle, octagon, pentagon, decagon, triangle, heart, star, and fleur-de-lis.

As illustrated in FIGS. 15-16, in yet another embodiment of the present invention, a flag stopper 400 is provided for use with a flagpole 102 configured to retain a flag 104. In such embodiment, the flag stopper 400 comprises an elongated member 402 having opposite first 402a and second 402b ends and a bendable body 404 disposed between the opposing ends 402a, 402b. The bendable body 404 preferably comprises a round cross section as illustrated in FIGS. 15-16. The flag stopper 400 preferably comprises one or two interchangeable heads 406a, 406b removably connected to each respective end 402a, 402b of the bendable body 404. In another embodiment, the interchangeable heads 406a, 406b are not removable from each respective end 402a, 402b of the bendable body 404, but rather in such embodiment, the interchangeable heads 406a, 406b are permanently affixed to each respective end 402a, 402b of the bendable body 404.

The interchangeable heads 406a, 406b preferably comprise ornamental features and characteristics which are seasonal in nature, so as, for instance, to reflect the season of Halloween or Mardi Gras, for example, at the option of the user.

As seen in FIG. 15, the flag stopper 400 is configured to wrap around (e.g., at 412) and closely secure a flagpole 102 as well as twist around (e.g. at 414) itself, such that the heads 406a, 406b project outwardly from such twisting and thus project outwardly from the flagpole 102 so as to restrain axial movement of a flag upon the flagpole 102, to retain the flag 104 upon the flagpole 102 during windy conditions.

In such embodiments illustrated in FIGS. 15-16, the flag stopper 400 preferably further comprises a sleeve 408 disposed between the first 402a and second 402b ends, wherein the sleeve 408 closely surrounds and is tightly fitted to the elongated bendable member 404. The sleeve 408 is preferably configured to provide a gripping surface 410 for the bendable member 404 to facilitate gripping of the bendable member 404 to the flagpole 102 when wrapped thereupon.

In another embodiment, the bendable body 404 may alternatively be an elongated, substantially flat member (not shown) forming two opposing planar surfaces, wherein the flat member is configured to bend and wrap around a flagpole 102 to grip to it.

It should be appreciated from the above example embodiments and explanations that the compact portable lightweight strong flag stoppers are configured to be easily and quickly attached to and removed from the flagpole, at the option of the use, at multiple locations without requiring assembly.

The unique and simple structures of embodiments of this invention result in significant increase in the retention of flags in multiple situations including when the flag pole 102 is disposed horizontally as well as when the flag pole 102 is disposed vertically or diagonally relative to the ground.

Embodiments of the present invention enable a user to achieve improved retention of a flag 104 on various sizes of flag poles 102 with elastic deformation flag retention, in combination with more convenient removal and replacement of a flag and of a flag stopper to suit the occasion, at the option of the user.

The claimed invention is:

1. A flag stopper for use with a flagpole configured to retain a flag, the flag stopper comprising:
   a planar body,
   said body having a coplanar pair of elongated legs,
   said elongated legs defining a narrow elongated slot in communication with a plurality of tiered apertures of decreasing size,
   said tiered apertures being sized and configured to firmly and removably receive and secure a portion of an outer cylindrical surface of a large diameter flagpole and alternatively a small diameter flagpole, respectively,
   wherein the elongated legs are configured to flex longitudinally away from each other by twisting said legs in opposing directions to provide for passage of a flagpole therebetween and then retract back into position so as to contract around the cylindrical surface of the flagpole, so that the flag stopper extends radially outwardly from said flagpole to retain a flag while the flag stopper is detachably coupled to and retained by the flagpole.

2. The flag stopper of claim 1, wherein said elongated planar body is a single piece of unitary construction in the shape of a fleur-de-lis.

3. The flag stopper of claim 1, wherein said elongated planar body is of unitary construction in the shape of a fleur-de-lis forming three pedals, such that the centered pedal is configured to receive the grasp of a user, each elongated leg having a flat inner surface, said flat inner surface being configured to guide the flagpole toward the tiered apertures when the legs of the flag stopper are pressed against the flagpole and only one of the elongated legs flexes longitudinally to provide for passage of the flagpole therebetween into one of the tiered apertures.

4. The flag stopper of claim 1, wherein said elongated planar body is of unitary construction in the shape of a fleur-de-lis forming three pedals, each elongated leg having a flat inner surface portion opposing a laterally extending outer surface portion of tiered orientation, said outer surface portions being configured to receive the grasp of a user and flexed longitudinally apart, thereby allowing one of the tiered apertures to receive the flagpole and contract around said flagpole upon the release of said legs by the user.

5. The flag stopper of claim 1, wherein each elongated leg is characterized as having a length sufficient to extend along an opposing surface of each respective side of a flag firmly disposed and secured between said elongated legs, the elongated legs thereby providing resistance against axial movement to prevent the flag from sliding along the flagpole and against lateral movement of the flag to prevent intertwining of the flag around the flagpole.

6. The flag stopper of claim 1, wherein the elongated legs are characterized as having a length either equal to or greater than the length of the flag.

7. The flag stopper of claim 1, wherein the body is a single piece, wherein the single piece is of a homogenous material.

8. The flag stopper of claim 1, wherein the planar body having said coplanar pair of elongated legs is characterized as having a sufficient height, width, and modulus of elasticity for said legs to flex longitudinally away from each other by a user twisting said coplanar pair of legs in opposing directions to provide for passage of a flagpole therebetween into one of the tiered apertures and then retract back into coplanar position so as to contract around the cylindrical surface of the flagpole upon release of a force exerted by the user upon the pair of elongated legs.

9. A flag stopper for use with a cylindrical flagpole configured to retain a flag, the flag stopper comprising:
a round planar body forming two opposing planar surfaces, the body comprising an outer portion relative to an inner portion,
said body defining a plurality of evenly spaced concentrically extending projections, each projection extending inwardly from a proximal base at the outer portion to a distal end at the inner portion, said distal end defining an outwardly concave tip, the outwardly concave tips of said plurality of projections configured to firmly engage a portion of the circumference of the cylindrical flagpole when it is received therein.

10. The flag stopper of claim 9, wherein said plurality of evenly spaced concentrically extending projections comprises a first set of at least two or more evenly spaced projections and a second set of at least two or more evenly spaced projections, wherein the projections of the first set are characterized as having a length greater than the length of the projections of the second set.

11. The flag stopper of claim 9, wherein said plurality of evenly spaced concentrically extending projections comprises a first set of at least two or more evenly spaced projections of equal length and a second set of at least two or more evenly spaced projections of equal length, wherein the projections of the first set are characterized as having a length greater than the length of the projections of the second set, said first set being configured to receive and firmly secure a portion of an outer cylindrical surface of a smaller diameter flagpole relative to said second set being configured to receive and secure a portion of an outer cylindrical surface of a larger diameter flagpole, respectively.

12. The flag stopper of claim 9, wherein said plurality of evenly spaced concentrically extending projections comprises a first set of at least two or more evenly spaced projections of equal length and a second set of at least two or more evenly spaced projections of equal length, wherein the projections of the first set are characterized as having a length greater than the length of the projections of the second set, said first set being configured to receive and firmly secure a portion of an outer cylindrical surface of a smaller diameter flagpole relative to said second set being configured to receive and secure a portion of an outer cylindrical surface of a larger diameter flagpole, respectively, wherein at least one planar surface is scored along the proximal base of the first set of projections, said scored projections configured to break away from the body upon initial receipt of a flagpole having the larger diameter.

13. The flag stopper of claim 9, said body further defining a slit through said body, wherein said slit extends from the outer portion to the inner portion thereby forming opposing coplanar sides of said planar body configured to flex in longitudinally opposing directions to provide for passage of the flagpole therebetween and then retract back into coplanar position wherein said plurality of projections firmly engage a portion of the circumference of the flagpole when it is received therein.

14. The flag stopper of claim 9, said body further defining a slit through said body, wherein said slit extends from the outer portion to the inner portion thereby forming opposing coplanar sides of said planar body configured to flex in longitudinally opposing directions to provide for passage of the flagpole therebetween and then retract back into coplanar position wherein said plurality of projections firmly engage a portion of the circumference of the flagpole when it is received therein, wherein said slit is oriented perpendicular to the periphery of said body.

15. The flag stopper of claim 9, wherein the flag stopper extends radially outwardly from said flagpole along a plane transverse thereto to retain a flag while the flag stopper is detachably coupled to and retained by the flagpole.

16. The flag stopper of claim 9, wherein at least one planar surface is engraved along the outer portion of the planar body for ornamentation.

17. The flag stopper of claim 9, wherein said flag stopper is a unitary construction forged from a material selected from a group consisting of plastic, resin, polypropylene, high-density polyethylene, rubber, and steel.

18. A flag stopper for use with a cylindrical flagpole configured to retain a flag, the flag stopper comprising:
a planar body defining a round aperture therethrough, the round aperture having an inner aperture surface comprising an inner aperture coupler;
an interchangeable inner ring having an outer surface and an inner surface, said outer surface comprising an outer surface coupler,
wherein the outer surface coupler and said inner aperture coupler are matched up to prevent the interchangeable inner ring from separating from the planar body;
said interchangeable inner ring configured to surround and firmly engage a portion of an outer surface of the cylindrical flagpole when it is received therein.

19. The flag stopper of claim 18, the interchangeable inner ring defining a plurality of evenly spaced radially outwardly extending slits, extending outwardly from said inner surface, said inner ring configured to firmly engage the circumference of the cylindrical flagpole having varying diameters, when it is received therein.

20. The flag stopper of claim 18, wherein said planar body is configured in a shape selected from the group consisting of a circle, oval, square, rectangle, octagon, pentagon, decagon, triangle, heart, star, and fleur-de-lis.

* * * * *